United States Patent
Xing et al.

(10) Patent No.: US 11,742,526 B2
(45) Date of Patent: *Aug. 29, 2023

(54) RECHARGEABLE BATTERY

(71) Applicant: Contemporary Amperex Technology Co., Limited, Ningde (CN)

(72) Inventors: Chengyou Xing, Ningde (CN); Zhijun Guo, Ningde (CN); Peng Wang, Ningde (CN); Taosheng Zhu, Ningde (CN); Yulian Zheng, Ningde (CN)

(73) Assignee: CONTEMPORARY AMPEREX TECHNOLOGY CO., LIMITED, Ningde (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/934,576

(22) Filed: Sep. 23, 2022

(65) Prior Publication Data

US 2023/0015012 A1     Jan. 19, 2023

Related U.S. Application Data

(63) Continuation of application No. 15/963,621, filed on Apr. 26, 2018, now Pat. No. 11,489,236.

(30) Foreign Application Priority Data

Jan. 16, 2018    (CN) ......................... 201810039812.5

(51) Int. Cl.
    *H01M 10/04*      (2006.01)
    *H01M 10/05*      (2010.01)
    (Continued)

(52) U.S. Cl.
   CPC ... *H01M 10/0587* (2013.01); *H01M 10/0431* (2013.01); *H01M 10/0525* (2013.01);
(Continued)

(58) Field of Classification Search
   CPC ............. H01M 50/531; H01M 50/538; H01M 10/0431; H01M 10/0587
   See application file for complete search history.

(56) References Cited

U.S. PATENT DOCUMENTS

| | | | |
|---|---|---|---|
| 11,489,236 B2 * | 11/2022 | Xing ................. | H01M 10/0431 |
| 2013/0330593 A1 * | 12/2013 | Kim .................. | H01M 10/0413 |
| | | | 429/179 |
| 2017/0207437 A1 | 7/2017 | Guo et al. | |

FOREIGN PATENT DOCUMENTS

| | | |
|---|---|---|
| CN | 102969477 A | 3/2013 |
| CN | 105845851 A | 8/2016 |

(Continued)

OTHER PUBLICATIONS

The first Office Action received in corresponding Chinese Application 201810039812.5.

(Continued)

*Primary Examiner* — Ula C Ruddock
*Assistant Examiner* — Frank A Chernow
(74) *Attorney, Agent, or Firm* — Kilpatrick Townsend & Stockton LLP

(57) ABSTRACT

Provided is a rechargeable battery including an electrode assembly comprising an electrode assembly body and an electrode tab protruding from the electrode assembly body, and a connecting member comprising a guiding plate and a first connecting plate connected to the guiding plate. The guiding plate extends in a width direction and the first connecting plate extends away from a plate surface of the guiding plate along the width direction or extends toward the plate surface of the guiding plate along the width direction. The electrode tab has a stacked multi-layer structure, the electrode tab protrudes from a portion of an end surface of the electrode assembly body in a longitudinal direction at a side of a split of the electrode assembly body perpendicular (Continued)

to the width direction, and the electrode tab is bent with respect to a longitudinal direction and is connected to the first connecting plate.

11 Claims, 25 Drawing Sheets

(51) Int. Cl.
    *H01M 50/50* (2021.01)
    *H01M 10/0587* (2010.01)
    *H01M 50/538* (2021.01)
    *H01M 50/531* (2021.01)
    *H01M 10/0525* (2010.01)
    *H01M 10/052* (2010.01)
    *H01M 50/536* (2021.01)

(52) U.S. Cl.
    CPC ....... *H01M 50/531* (2021.01); *H01M 50/538* (2021.01); *H01M 10/052* (2013.01); *H01M 50/536* (2021.01); *Y02E 60/10* (2013.01); *Y02T 10/70* (2013.01)

(56) References Cited

FOREIGN PATENT DOCUMENTS

| | | |
|---|---|---|
| CN | 106104867 A | 11/2016 |
| CN | 106972144 A | 7/2017 |
| CN | 206806417 U | 12/2017 |
| DE | 102014019505 A1 | 6/2016 |
| JP | 2013196959 A | 9/2013 |

OTHER PUBLICATIONS

Decision to Grant a Patent received in corresponding Chinese Application 201810039812.5.
The first search report received in corresponding Chinese Application 201810039812.5.
The extended European search report received in corresponding European Application 18171041.9.
The Restriction Requirement received in parent U.S. Appl. No. 15/963,621.
The Final Rejection received in parent U.S. Appl. No. 15/963,621.

* cited by examiner

RECHARGEABLE BATTERY

CROSS-REFERENCE TO RELATED INVENTIONS

The present application is a continuation of U.S. application Ser. No. 15/963,621, filed Apr. 26, 2018 and entitled "RECHARGEABLE BATTERY", which claims priority to Chinese Patent Invention No. 201810039812.5, filed on Jan. 16, 2018, the content of which is incorporated herein by reference in its entirety.

TECHNICAL FIELD

The present disclosure relates to the technical field of batteries and, in particular, relates to a rechargeable battery.

BACKGROUND

With the development of science and technology, the requirements on rechargeable batteries keep rising. As an example, the lithium-ion batteries, due to their high energy density, high power density, long cycle life and long storage time and the like, are widely used in portable electronic devices, such as mobile phones, digital cameras and laptops and are also prospective in the application in the fields of electric vehicles, such as electric automobile, electric bicycles and others, and other large and medium-sized electric equipment such as energy storage facilities. Therefore, the lithium-ion batteries are becoming an important technical solution to global problems such as energy crisis and environmental pollution. The equipment using rechargeable batteries has higher and higher demands on the energy density and safety performance of the rechargeable batteries.

In the square rechargeable battery in the prior art, an electrode tab of the electrode assembly is connected to a connecting member. A first connecting plate of the connecting member connected to the electrode tab is generally parallel to the longitudinal direction of the electrode assembly. With the growing market demand of a large current battery, a sufficient welding area between the first connecting plate and the electrode tab should be ensured to meet the requirement against the temperature rise where the current flows. Therefore, the first connecting plate must have a sufficient dimension in the longitudinal direction of the electrode assembly, which will inevitably take up much more space, resulting in less space utilization of the electrode assembly and low energy density.

SUMMARY

The object of the present disclosure is to provide a rechargeable battery, aimed at improving the energy density of the rechargeable battery.

The present disclosure provides a rechargeable battery including an electrode assembly and a connecting member, wherein the electrode assembly comprises an electrode assembly body and an electrode tab protruding from the electrode assembly body, the electrode assembly body is formed by winding a positive electrode sheet, a negative electrode sheet, and a separator placed between the positive electrode sheet and the negative electrode sheet, the connecting member comprises a guiding plate and a first connecting plate connected to the guiding plate, wherein the guiding plate extends in a width direction and the first connecting plate extends away from a plate surface of the guiding plate along the width direction or extends toward the plate surface of the guiding plate along the width direction, wherein the electrode tab has a stacked multi-layer structure, the electrode tab protrudes from a portion of an end surface of the electrode assembly body in a longitudinal direction at a side of a split of the electrode assembly body perpendicular to the width direction, and the electrode tab is bent with respect to a longitudinal direction and is connected to the first connecting plate.

In some embodiments, the electrode assembly comprises a positive electrode tab and a negative electrode tab, wherein the positive electrode tab and the negative electrode tab protrude from the same side of the split of the electrode assembly body perpendicular to the width direction, respectively; or the positive electrode tab and the negative electrode tab protrude from different sides of the split of the electrode assembly body perpendicular to the width direction, respectively.

In some embodiments, the electrode assembly body comprises a winding start layer, the winding start layer is an end portion of an innermost electrode sheet of the electrode assembly body from which winding is started, and the electrode tab protrudes from a portion of the end surface of the electrode assembly body in the longitudinal direction at a side of a plane in which the winding start layer is located.

In some embodiments, the electrode assembly comprises a positive electrode tab and a negative electrode tab, wherein the positive electrode tab and the negative electrode tab protrude from the same side of the plane in which the winding start layer is located, respectively; or the positive electrode tab and the negative electrode tab protrude from different sides of the plane in which the winding start layer is located, respectively.

In some embodiments, the connecting member comprises two first connecting plates which are connected to two edges of the guide plate in the width direction, respectively, the rechargeable battery comprises two sets of electrode assemblies, the two sets of electrode assemblies are arranged side by side along the width direction and form two sets of electrode tabs of the same polarity at the same end of the rechargeable battery, and the two sets of electrode tabs are respectively bent with respect to the longitudinal direction and are connected to the two first connecting plates.

In some embodiments, an electrode tab of each electrode assembly in one set of the two set of electrode assemblies protrudes from a portion of an end surface of an electrode assembly body of the each electrode assembly in the longitudinal direction at a side of a split of the electrode assembly body perpendicular to the width direction away from the other set of the two sets of electrode assemblies, or an electrode tab of each electrode assembly in one set of the two set of electrode assemblies protrudes from a portion of an end surface of an electrode assembly body of the each electrode assembly in the longitudinal direction at a side of a split of the electrode assembly body perpendicular to the width direction close to the other set of the two sets of electrode assemblies.

In some embodiments, each of the two sets of electrode assemblies comprises two electrode assemblies and an electrode tab of one electrode assembly in one set of the two sets of electrode assemblies protrudes from a portion of an end surface of an electrode assembly body of the one electrode assembly in the longitudinal direction at a side of a split of the electrode assembly body perpendicular to the width direction close to the other electrode assembly in the one set.

In some embodiments, each of the two first connecting plates extends away from the plate surface of the guiding plate along the width direction or extends toward the plate surface of the guiding plate along the width direction.

In some embodiments, at least a part of the electrode tab is placed between the first connecting plate and the electrode assembly body.

In some embodiments, at least a part of the guiding plate protrudes toward the electrode assembly body with respect to the first connecting plate to form a convex portion, the convex portion abutting against the electrode assembly body.

In some embodiments, the convex portion is laminated on the electrode assembly body.

In some embodiments, the guiding plate comprises a main plate body and a flanging portion, the flanging portion is located at a lateral edge of the main plate body in the width direction and extends in a direction away from the electrode assembly body, and the first connecting plate is connected to the guiding plate by the flanging portion.

Based on the chargeable battery provided by the present disclosure, the first connecting plate extends away from a plate surface of the guiding plate along the width direction or extends toward the plate surface of the guiding plate along the width direction, effectively reducing the space occupied by the connecting member at the end of the rechargeable battery in the longitudinal direction. The electrode tab protrudes from a portion of an end surface of the electrode assembly body in a longitudinal direction at a side of a split of the electrode assembly body perpendicular to the width direction, effectively reducing the thickness of the electrode tab while allowing the electrode tab to have sufficient flow area, and further reducing the space occupied by the connection between the connecting member and the electrode tab. Therefore, the space utilization of the rechargeable battery and the energy density of the rechargeable battery are effectively improved. Further, since the thickness of electrode tab is reduced, the degree of misalignment between the multiple layers of the electrode tab caused by the bending of the electrode tab is advantageously lowered.

BRIEF DESCRIPTION OF DRAWINGS

The drawings described herein are used to facilitate the understanding of the present disclosure and constitute a part of the present application. The exemplary embodiments and the description of the present disclosure are used to explain the present disclosure, but not intended to improperly limit the present disclosure. In the drawings.

DESCRIPTION OF EMBODIMENTS

Figure 1:
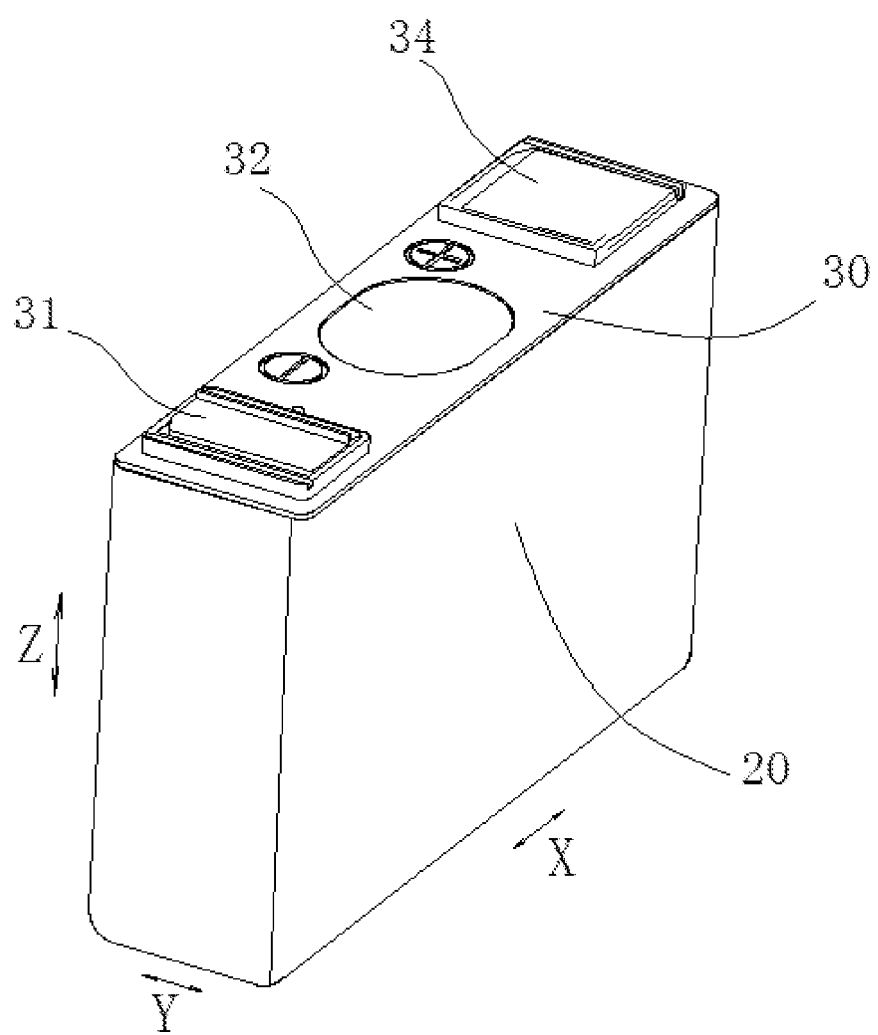
FIG. 1 illustrates a three-dimensional schematic structural diagram of an rechargeable battery according to an embodiment of the present disclosure.
Figure 2:
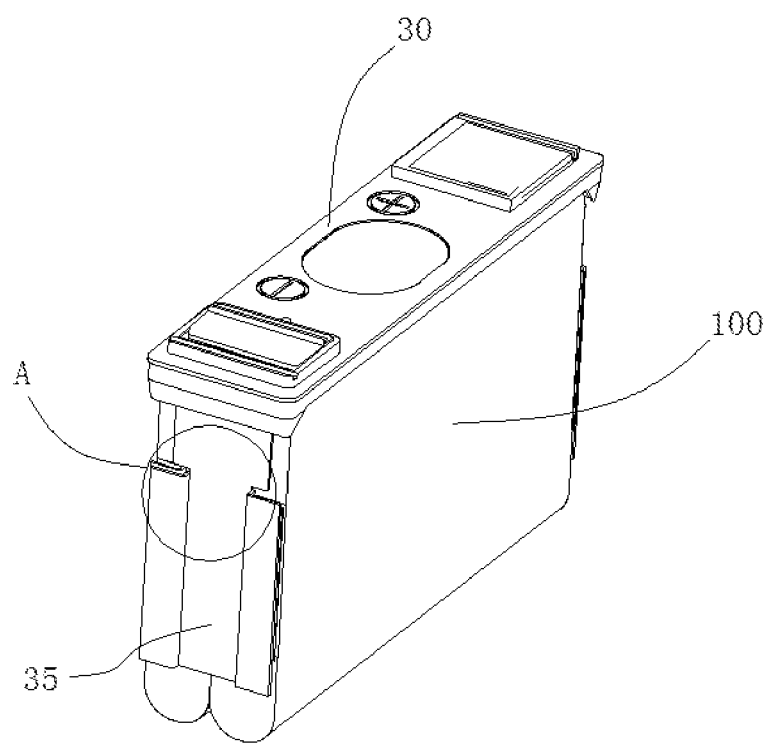
FIG. 2 illustrates a three-dimensional schematic structural diagram of the rechargeable battery shown in FIG. 1 after a housing of the rechargeable battery is removed.

The technical solutions in the embodiments of the present disclosure are clearly and completely described below with reference to the accompanying drawings included in the embodiments of the present disclosure. The described embodiments are merely exemplary, rather than all of the embodiments of the present disclosure. The following description of at least one exemplary embodiment is merely illustrative, but not intended to limit the invention and its application or use. All other embodiments obtained by those skilled in the art based on the embodiments of the present disclosure without creative efforts shall fall within the protection scope of the present disclosure.

The relative arrangement, mathematical expressions and numerical values of the components and steps set forth in these embodiments do not limit the scope of the invention, unless otherwise specified. In the meantime, it should be understood that, for simplifying the description, the dimensions of the parts shown in the drawings are not drawn according to the actual scale. Techniques, methods, and devices that are known to those skilled in the relevant art may not be discussed in detail but, where appropriate, the techniques, methods, and devices should be considered as part of the specification. In all of the examples shown and discussed herein, any specific value should be interpreted as merely illustrative and not as a limitation. Therefore, other variations of the exemplary embodiments may have different values. It should be noted that similar reference numbers and letters designate similar items in the following drawings, and thus any item, which has been defined in the description of one figure, will not be further discussed in the description of the subsequent figures.

It should be understood that "first" and "second" and other terms in the description of the present disclosure are used to distinguish the corresponding parts from one another. Unless otherwise specified, the terms have no special meaning, so that they cannot be interpreted as limitation to the protection scope.

In the description of the present disclosure, it should be understood that the terms such as "front, back, up, down, left, right", "transverse, vertical, horizontal" as well as "top and bottom" indicate the orientational or positional relationships that are generally based on the orientation or positional relationships shown in the drawings for ease of description, and are merely intended to describe the present disclosure and simplify the describing. Unless indicated otherwise, it should not be understood that the devices or elements described with these terms must be disposed in specific orientations or position, and thus should not be construed as limitation to the protection scope of the present disclosure. The terms "inside" or "outside" refer to the inside or the outside with respect to the outline of respective component.

In the description of the present disclosure, the "longitudinal direction" refers to the longitudinal direction of the rechargeable battery and also the longitudinal direction of the electrode assembly 100, corresponding to the direction X in FIG. 1. The "width direction" refers to the width direction of the rechargeable battery, corresponding to the direction Y in FIG. 1, and the "width direction" also refers to the width direction of a connecting member and a guiding plate thereof. The "height direction" refers to a direction perpendicular to the longitudinal direction and the width direction, corresponding to the direction Z in FIG. 1, the "height direction" is the height direction of the rechargeable battery and the electrode assembly and also the height direction of the connecting member and the guiding plate thereof.

FIGS. 1-38 illustrate the structure of the rechargeable batteries and the components thereof according to the embodiments of the present disclosure.

As shown in FIGS. 1 to 38, the rechargeable battery includes an electrode assembly 100 and a connecting member 35. The electrode assembly 100 includes an electrode assembly body 110 and an electrode tab 120 extending from the electrode assembly body 110. The electrode assembly body 110 is formed by winding a positive electrode sheet, a negative electrode sheet, and a separator placed between the positive electrode sheet and the negative electrode sheet. The connecting member 35 includes a guiding plate 353 and a first connecting plate 351 connected to the guiding plate 353, the guiding plate 353 extends in the width direction, the first connecting plate 351 extends away from a plate surface of the guiding plate 353 along the width direction Y or extends toward the plate surface of the guiding plate 353 along the width direction Y. The electrode tab 120 has a stacked multi-layer structure and protrudes from an end surface of the electrode assembly body 110 in the longitudinal direction X (herein, the end surface is generally perpendicular to the longitudinal direction), and the electrode tab 120 is bent with respect to the longitudinal direction and is connected with the first connecting plate 351.

On the basis of the rechargeable battery provided by the present disclosure, the first connecting plate 351 of the connecting member 35 extends away from the plate surface of the guiding plate 353 along the width direction Y of the electrode assembly body 110, effectively reducing the space occupied by the connecting member 35 at an end of the rechargeable battery in the longitudinal direction X. Further, the electrode tab 120 of the electrode assembly 100 protrudes from a portion of an end surface of the electrode assembly body 110 in the longitudinal direction X at a side of a split of the electrode assembly body 110 perpendicular to the width direction Y, and a thickness of the electrode tab 120 in the width direction Y can be effectively reduced while the electrode tab 120 has a sufficient flow area. Therefore, the space occupied by the connection between the connecting member 35 and the electrode tab 120 is reduced, thereby effectively increasing the space utilization of the rechargeable battery and the energy density of the rechargeable battery. Further, due to the reduced thickness of the electrode tab, misalignment among the multiple layers of the electrode tab caused by the bending of the electrode tab 120 can be reduced.

Since the overall thickness of the electrode tab 120 is reduced, a length of the electrode tab 120 in the longitudinal direction X of the electrode assembly 100 can be effectively reduced after the electrode tab 120 is connected to the first connecting plate 351, so that the movable space for the electrode tab 120 along the longitudinal direction X of the electrode assembly 100 is effectively reduced. When the rechargeable battery is subjected to vibration or impact, the electrode tab 120 is difficult to be damaged, and the electrode tab 120 is unlikely to be inserted into the electrode assembly body 110 after being pressed, thereby reducing the risk of internal short circuit of the rechargeable battery, and improving the service life and safety performance of the electrode assembly 100.

The embodiments of the present disclosure are illustrated below with reference to FIGS. 1-38.

In the embodiments shown in FIGS. 1-10, the rechargeable batteries mainly include a housing 20, a top cover 30, an electrode assembly 100 and a connecting member 35.

Figure 7:
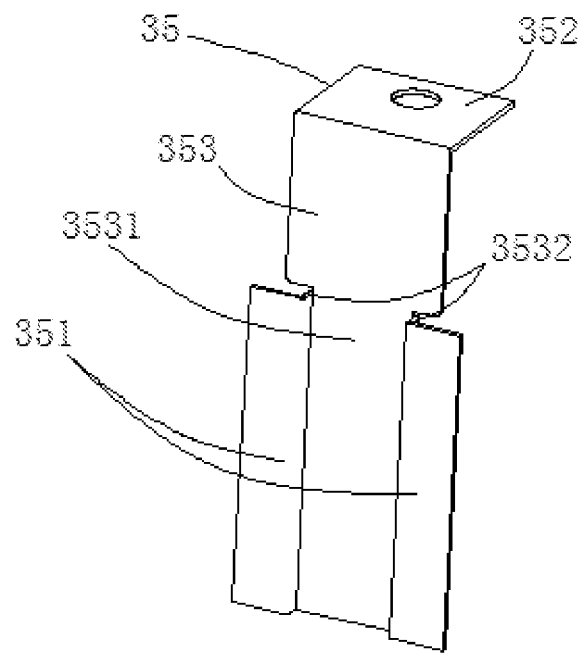
FIG. 7 illustrates a schematic structural diagram of the connecting member in FIG. 6 after the first connecting plate is bent with respect to the guiding plate.

As shown in FIG. 7, the connecting member 35 includes a guiding plate 353, a first connecting plate 351 which is connected to a lateral edge of the guiding plate 353 in the width direction Y, and a second connecting plate 352 which is connected to the guiding plate 353 and is used for electrically connecting to an device outside the rechargeable battery, for example, a charger or an electric consuming device.

The housing 20 and the top cover 30 cooperatively form a mounting space, in which the electrode assembly 100 and the guiding plate 353 and the first connecting plates 351 of the connecting member 35 are located. The second connecting plate 352 of the connecting member 35 is connected to an electrode component on the top cover 30. Specifically, a connecting hole is defined in the second connecting plate 352, and the second connecting plate 352 is connected to the electrode component through the connecting hole.

As shown in FIG. 1, the electrode component on the top cover 30 includes a positive electrode component 31 for electrically connecting to a positive electrode of the electrode assembly 100 and a negative electrode component 34 for electrically connecting to a negative electrode of the electrode assembly 100. The top cover 30 is also provided with an explosion-proof valve 32. Other structures such as an injection hole may also be provided on the top cover 30.

The connecting member 35 of the rechargeable battery can be fixedly connected to the top cover 30 and the electrode component thereon, and then connected to the electrode assembly 100. During the connecting of the connecting member 35 to the electrode assembly 100, the first connecting plate 351 is fixedly connected to the electrode tab 120 while forming an specific angle with an end surface of the electrode assembly body 110 after the guiding plate 353 is positioned with respect to the electrode assembly body 110, and then the first connecting plate 351 is bent to an assembling position. At the same time, the electrode tab 120 is bent with respect to the longitudinal direction X of the electrode assembly body 110 with the bending of the first connecting plate 351. For example, in an embodiment, the first connecting plate 351 is bent until being parallel to the end surface of the electrode assembly body 110. After the connecting member 35 and the electrode assembly 100 are assembled, the connecting member 35 and the electrode assembly 100 are together accommodated in the housing 20. After the connecting member 35 and the electrode assembly 100 are assembled, the top cover 30 exactly covers an opening of the housing 20, and then the top cover 30 and the housing 20 are connected and sealed.

Figure 8:
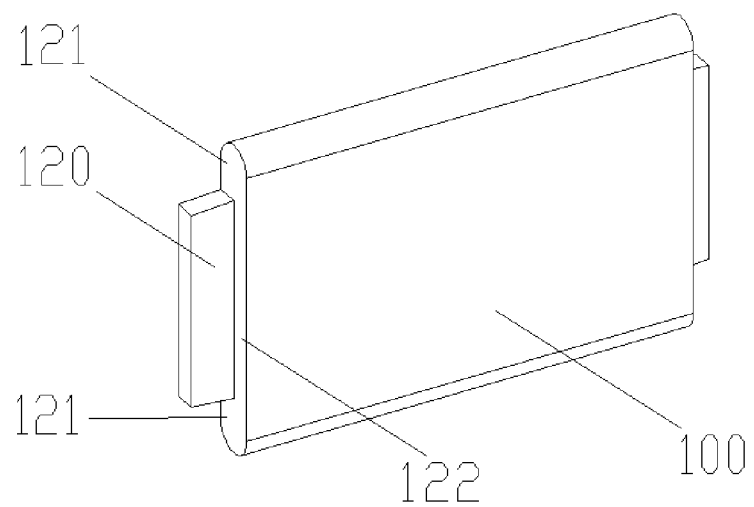
FIG. 8 illustrates a schematic structural diagram of an electrode assembly of a rechargeable battery according to an embodiment of the present disclosure.
Figure 9:
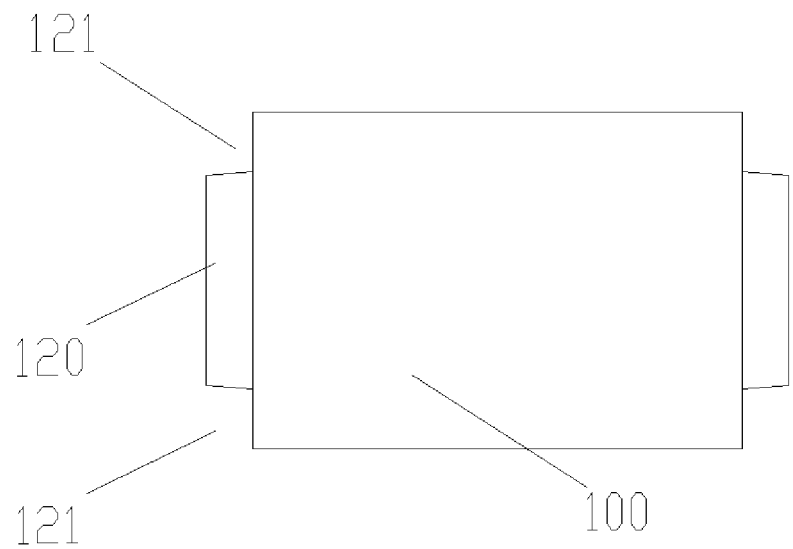
FIG. 9 illustrates a front view of the electrode assembly shown in FIG. 8.
Figure 10:
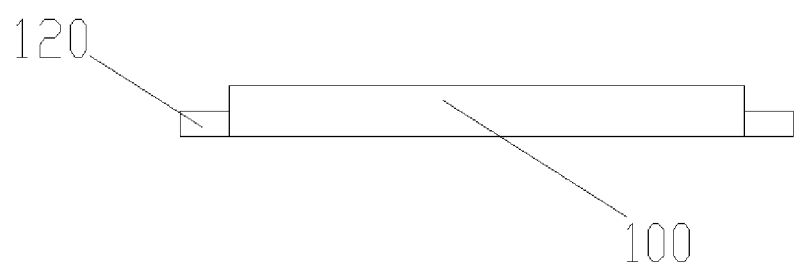
FIG. 10 illustrates a bottom view of the electrode assembly shown in FIG. 8.

As shown in FIGS. 8-10, the electrode assembly 100 includes the electrode assembly body 110 and the electrode tab 120 extending from the electrode assembly body 110.

The electrode assembly 100 is a square electrode assembly formed by winding a positive electrode sheet, a separator, and a negative electrode sheet, after the positive electrode sheet, the separator and the negative electrode sheet are stacked. The width direction of the positive electrode sheet, separator and negative electrode sheet forms the longitudinal direction X of the electrode assembly 100.

The positive electrode sheet and the negative electrode sheet each include a substrate and an active material coated on the substrate. An area coated with the active material on the substrate forms a coated area. The separator is used to separate the positive electrode sheet from the negative electrode sheet so as to prevent the short circuit inside the rechargeable battery. The substrate of the positive electrode sheet may be a first metal foil, for example, an aluminum foil. The substrate of the negative electrode sheet may be a second metal foil, such as a copper foil. The electrode assembly 100 includes a positive electrode tab and a negative electrode tab. The positive electrode tab is formed by a portion uncoated with the active material on one side edge of the first metal foil. The negative electrode tab is formed by a portion uncoated with the active material on one side edge of the second metal foil. Therefore, the tabs have a stacked multi-layer structure. In this embodiment, the positive electrode tab includes a plurality of stacked first metal foils, and the negative electrode tab includes a plurality of stacked second metal foils.

In an embodiment, the positive electrode tab and the negative electrode tab are disposed at two ends of the electrode assembly 100 in the longitudinal direction X, and protrude beyond the corresponding ends of the separator, respectively.

As shown in FIGS. 8-10, in the electrode assembly 100 according to this embodiment, the electrode tab 120 protrudes from a portion of an end surface of the electrode assembly body 110 in the longitudinal direction X at a side of a split of the electrode assembly body 110 perpendicular to the width direction Y. As shown in FIG. 8, the electrode tab 120 protrudes from a rear portion of the end surface of the electrode assembly body 110 in the longitudinal direction X, rather than from a front portion of the end surface of the electrode assembly body 110, with respect to the split of the electrode assembly body 110 perpendicular to the width direction Y. Therefore, an empty space is formed in the width direction Y. This arrangement reduces a dimension of the electrode tab 120 in the longitudinal direction X of the electrode assembly 100 after the first connecting plate 351 is bent with respect to the guiding plate 353, so that the first connecting plate 351 is closer to the electrode assembly body 110 and an integral dimension of the connecting member 35 and the electrode assembly body 110 in the longitudinal direction X is reduced, thereby increasing the energy density of the rechargeable battery.

In the present embodiment, the electrode tab 120 includes a positive electrode tab and a negative electrode tab, the positive electrode tab and negative electrode tab being arranged on two ends of the electrode assembly body 110 in the longitudinal direction X, respectively. Specifically, the positive electrode tab and the negative electrode tab protrude from the same side of the split of the electrode assembly body 110 perpendicular to the width direction Y. For example, the positive electrode tab and the negative electrode tab protrude from two opposite portions of the two end surfaces of the electrode assembly body 110 in the longitudinal direction at the same side of the split of the electrode assembly body 110 perpendicular to the width direction Y, respectively. In this case, the two ends of the electrode assembly 100 have similar mechanical property.

Figure 11:
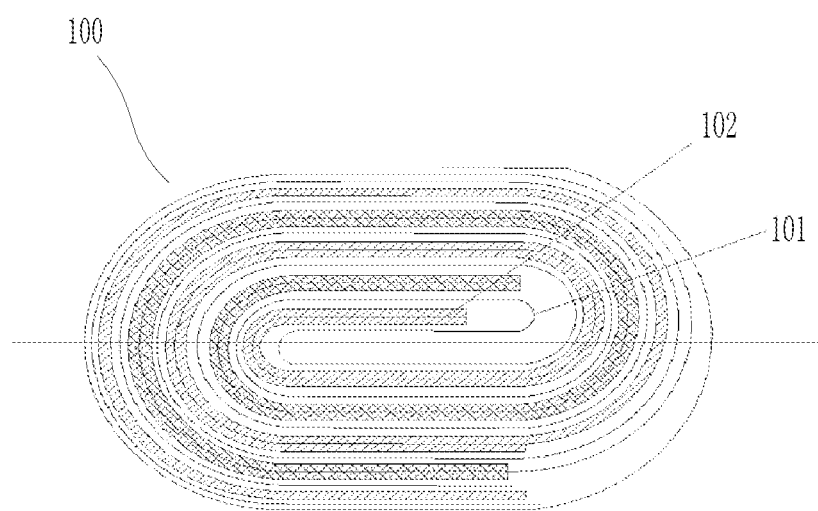
FIG. 11 illustrates a cross-sectional schematic structural diagram of an electrode assembly body formed by co-winding a positive electrode sheet, a negative electrode sheet, and a separator placed between the positive electrode sheet and the negative electrode sheet.

FIG. 11 illustrates a cross-sectional structural schematic diagram of an electrode assembly body formed by winding a positive electrode sheet, a negative electrode sheet, and a separator placed between the positive electrode sheet and the negative electrode sheet. The separator separates the positive electrode sheet from the negative electrode sheet. The electrode assembly body 110 of the electrode assembly 100 includes a winding start layer 102. The winding start layer 102 is a portion of an innermost electrode sheet of the electrode assembly body 110 from which the winding is started. In some embodiments, the electrode tab 120 protrudes from a portion of an end surface of the electrode assembly body 110 in the longitudinal direction X at a side of a plane in which the winding start layer 102 is located. Further, the positive electrode tab and the negative electrode tab of the same electrode assembly body 110 protrude from the same side of the plane in which the winding start layer 102 is located. For example, the positive electrode tab and the negative electrode tab protrude from two opposite portions of the two end surfaces of the electrode assembly body 110 in the longitudinal direction at the same side of the plane in which the winding start layer 102 is located.

In some embodiments not shown, the positive electrode tab and the negative electrode tab protrude from different sides of the split of the electrode assembly body 110 perpendicular to the width direction Y or from different sides of the plane in which the winding start layer 102 is located. That is, the positive electrode tab and the negative electrode tab protrude from two non-opposite portions of the two end surfaces of the electrode assembly body 110 in the longitudinal direction X at the two different sides of the split of the electrode assembly body 110 perpendicular to the width direction Y, respectively. For example, the positive electrode tab extends from a rear portion of one end surface of the electrode assembly body 110 in the longitudinal direction X at a side of the split of the electrode assembly body 110 perpendicular to the width direction Y, and the negative electrode tab extends from a front portion of the other end surface in the longitudinal direction X at the other side of the split of the electrode assembly body 110 perpendicular to the width direction Y. Upon simulation tests, it have been proven that, the current density in the case of the positive and negative electrode tabs protrude from different sides of the split of the electrode assembly body 110 perpendicular to the width direction Y or from different sides of the plane in which the winding start layer 102 is located is much evener than that in the case of them extending from the same side of the split of the electrode assembly body 110 perpendicular to the width direction Y or from the same side of the plane in which the winding start layer 102 is located.

As shown in FIG. 10, the electrode tabs 120 are provided at the same side of the split of the electrode assembly body 110 perpendicular to the width direction Y.

As shown in FIGS. 8 and 9, the electrode tab 120 is located on the middle portion of the end surface of the electrode assembly body 110 in the height direction Z. As shown in FIG. 9, in the height direction Z of the electrode assembly 100, empty spaces 121 are formed above and below the electrode tab 120, respectively. This arrangement facilitates bending of the electrode tab 120 so that the electrode tab 120 can be positioned between the first connecting plates 351 and the electrode assembly body 110.

The connecting member 35 is located at an end of the electrode assembly 100 in the longitudinal direction X. In the present embodiment, each of two ends of the electrode assembly 100 in the longitudinal direction X is provided with a connecting member 35. One of the connecting members 35 is connected to the positive electrode tab of the electrode assembly 100 and the other one is connected to the negative electrode tab of the electrode assembly 100. The connecting member 35 connected to the positive electrode tab of the electrode assembly 100 is connected to the positive electrode component 31 on the top cover 30 and the connecting member 35 connected to the negative electrode tab of the electrode assembly 100 is connected to the negative electrode component 34 on the cover top 30. In this way, the electrode tab 120 can be electrically connected to the corresponding electrode component by the connecting member 35.

In the present embodiment, the connecting members 35 disposed on the two ends of the electrode assembly 100 are connected to the electrode tabs on two corresponding ends in a same manner. Thus, as an example, the following description merely illustrates one connecting member 35 disposed on one of the ends of the electrode assembly 100 in the longitudinal direction X as well as the connection between this connecting member 35 and the electrode assembly 100.

As shown in FIGS. 2-7, the connecting member 35 includes two first connecting plates 351 connected to two edges of the guiding plate 353 in the width direction Y, respectively. The second connecting plate 352 is located above the electrode assembly 100 and bent toward the electrode assembly 100 with respect to the guiding plate 353. In this embodiment, the second connecting plate 352 is electrically connected to the electrode component. In the embodiments which are not shown in the figures, the second connecting plate may also serve as the electrode component of the rechargeable battery, so that it is unnecessary to provide additional electrode component.

In an embodiment shown in FIGS. 2-5, the first connecting plates 351 are located at sides of the guiding plate 353 away from a plate surface of the guiding plate 353 in the width direction and are parallel to the end surface of the electrode assembly body 110 in the longitudinal direction X of the electrode assembly 100, i.e., an end surface perpendicular to the longitudinal direction X of the electrode assembly 100.

In a preferred embodiment, at least a part of the guiding plate 353 protrudes toward the electrode assembly 100 with respect to the first connecting plates 351 and forms a convex portion, and the convex portion abuts against the electrode assembly 100.

Since at least a part of the guiding plate 353 protrudes toward the electrode assembly 100 with respect to the first connecting plates 351 to form the convex portion and the convex portion abuts against the electrode assembly 100, the convex portion protruding towards the electrode assembly 100 contacts the electrode assembly 100 and the connecting member 35 bears force when the battery is vibrated or impacted, so as to effectively alleviate the risk of rupture of the electrode tab 120 caused by the vibration or impact. In the meantime, since the space for the movement of the electrode tab 120 is reduced, the possibility of the electrode tab penetrating into the electrode assembly body 110 after being pressed is reduced, thereby reducing the risk of the short circuit inside the battery. Since the possibility of the electrode tab 120 being ruptured and the possibility of the electrode tab being inserted into the electrode assembly body 110 both are reduced, the service life and safety performance of the electrode assembly 100 can be improved.

Figure 3:
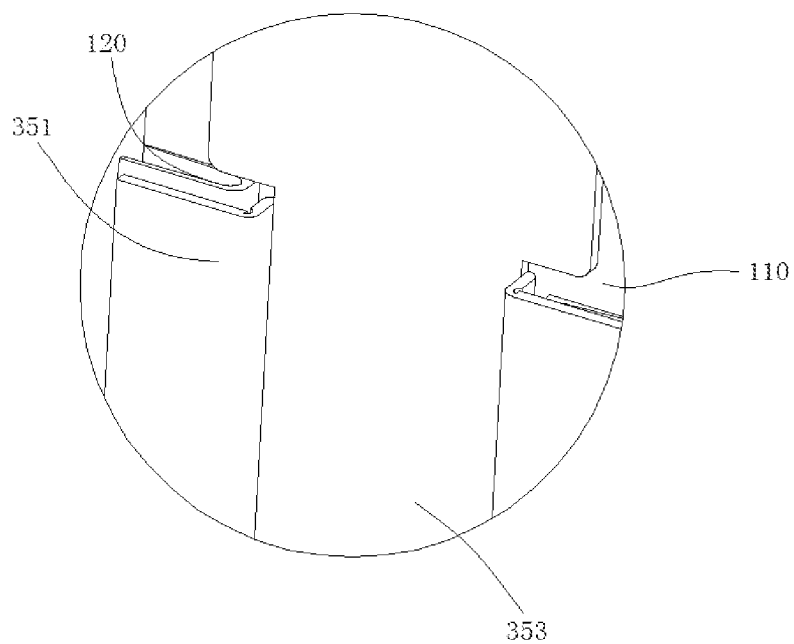
FIG. 3 illustrates an enlarged diagram of part A of the rechargeable battery shown in FIG. 2.
Figure 4:
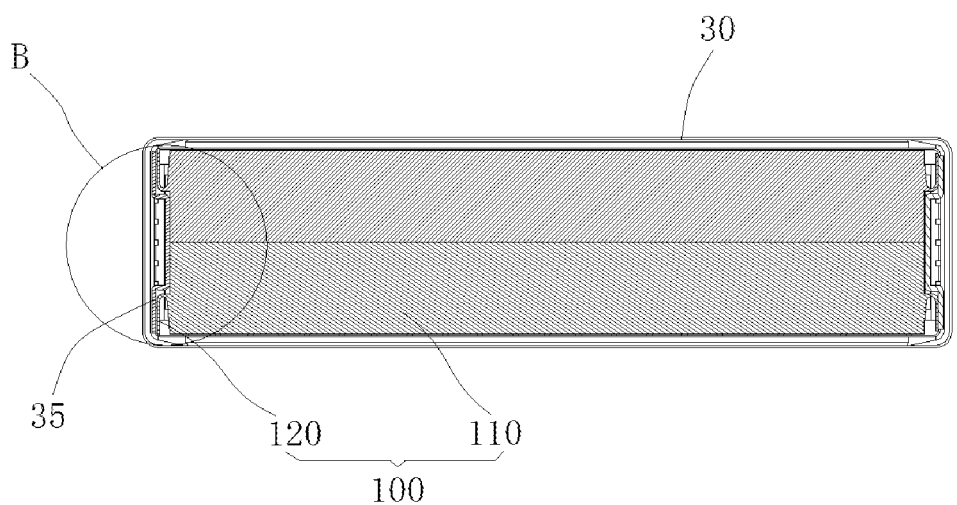
FIG. 4 illustrates a cross-sectional view of the rechargeable battery shown in FIG. 2.

In a preferred embodiment shown in FIGS. 3-4, at least a part of the guiding plate 353 is laminated on the electrode assembly body 110. In some embodiment, the guiding plate 353 is entirely laminated on the end surface of the electrode assembly body 110. This arrangement can protect the electrode tab 120 from being damaged and penetrating into the electrode assembly body 110 when the rechargeable battery is vibrated or impacted. Thus, the service life and safety performance of the electrode assembly 100 are further improved.

In an embodiment, the connecting member 35 is made of an integral sheet material. During assembling of the connecting member 35 with the electrode assembly 100, after the guiding plate 353 is positioned with respect to the electrode assembly body 110, the first connecting plates 351 are fixedly connected to the electrode tab 120 while being parallel to the longitudinal direction X of the electrode assembly 100, and then the first connecting plates 351 are bent away from the guiding plate 353 along the width direction Y while the electrode tab 120 is bent in the same way, so as to finish the assembling of the connecting member 35 with the electrode assembly 100.

In some embodiments which are not shown in the drawings, the first connecting plates 351 are fixedly connected to the electrode tab 120 while forming an specific angle with the longitudinal direction X of the electrode assembly 100 after the guiding plate 353 is positioned with respect to the electrode assembly body 110, and then the first connecting plates 351 are bent toward the plate surface of the guiding plate 353 in the width direction, so as to finish the assembling of the connecting member 35 with the electrode assembly 100.

In the above-mentioned assembling manners, the operating space is large during fixing the electrode tab 120 on the first connecting plate 351, so that the firm connection between the electrode tab 120 and the first connecting plate 110 is easily achieved, thereby ensuring the connection quality thereof.

As shown in FIGS. 2-7, in a preferred embodiment, the guiding plate 353 includes a main plate body 3531 and two flanging portions 3532, i.e., the above convex portion of the guiding plate 353 includes a main plate body 3531 and two flanging portions 3532. The flanging portions 3532 are located at lateral edges of the main plate body 3531 in the width direction Y and extend in a direction away from the electrode assembly 100. The first connecting plates 351 are connected to the guiding plate 353 by the flanging portions 3532.

In the embodiment shown in FIGS. 2-7, the main plate body 3531 is a flat plate. The flanging portions 3532 are perpendicular to the main plate body 3531. In some other embodiments which are not shown in the drawings, the flanging portions 3532 tilt toward the plate surface of the main plate body 3531, or the flanging portions 3532 tilt away from the plate surface of the main plate body 3531.

As shown in FIGS. 2-5 and FIG. 7, the first connecting plates 351 are parallel to the main plate body 3531. In this case, the first connecting plates 351 and the main plate body 3531 are all perpendicular to the longitudinal direction X of the electrode assembly 100.

In some embodiments which are not shown in the drawings, the first connecting plates 351 and the main plate body 3531 may form a certain angle. For example, a free end of the first connecting plate 351 in the width direction Y may be closer to the electrode assembly body 110 than a fixed end of the first connecting plate 351 in the width direction Y.

As shown in FIGS. 3-7, in a preferred embodiment, a notch 35A is formed between each of the first connecting plates 351 and the guiding plate 353 so that a weak position is formed at the notch 35A between the first connecting plate 351 and the guiding plate 353, so that a bending position of the first connecting plate 351 is more accurate when the first connecting plate 351 is bent with respect to the guiding plate 353. It is beneficial for the successful assembling of the electrode assembly 100 and the connecting member 351 with the housing 20. The notches 35A facilitate the bending of the first connecting plates 351, so as to reduce possible damage to the electrode assembly 100 and the electrode tab 120 thereof caused by the bending.

As shown in FIGS. 2-5, the connecting member 35 includes two first connecting plates 351 disposed on two sides of the guiding plate 353 in the width direction, respectively. The rechargeable battery includes two electrode assemblies 100 arranged side by side. The electrode tabs of same polarity of the two electrode assemblies are connected to the two first connecting plates 351, respectively. In an embodiment, the two electrode assemblies 100 are symmetrically arranged.

In a preferred embodiment, the electrode tab 120 of each of the two electrode assemblies 100 extends from a side of the electrode assembly 100 away from the other electrode assembly 100.

Figure 5:
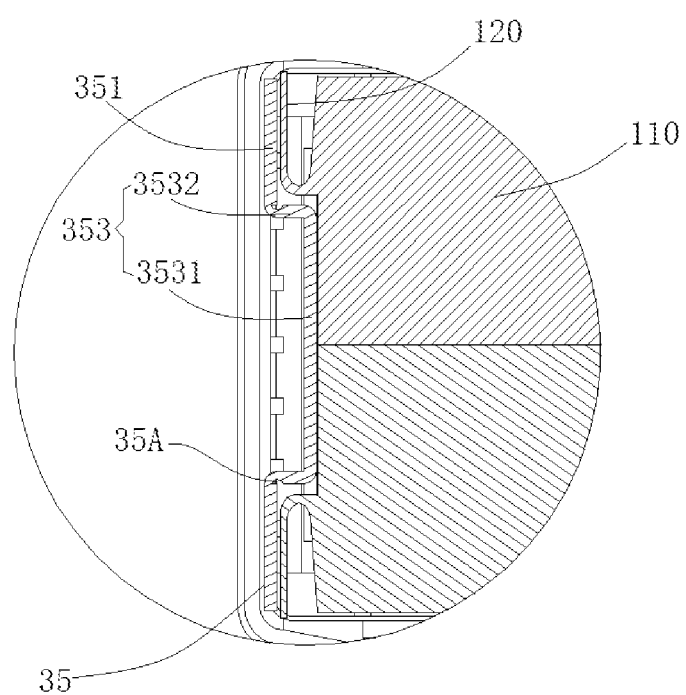
FIG. 5 illustrates an enlarged diagram of part B in FIG. 4.
Figure 6:
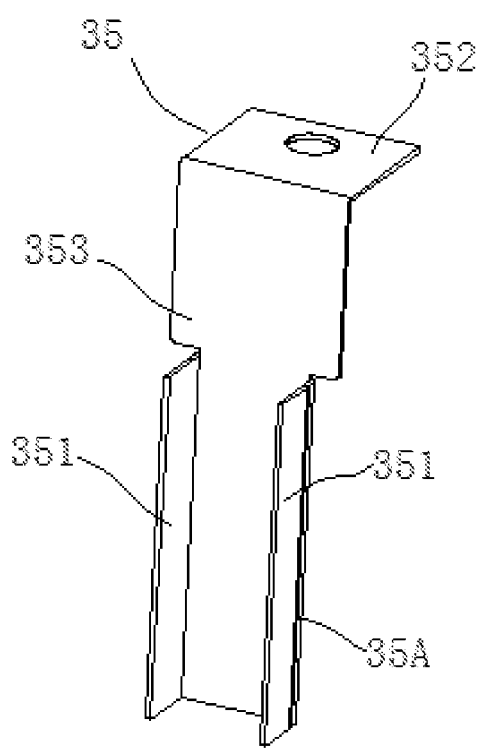
FIG. 6 illustrates a schematic structural diagram of a connecting member of a rechargeable battery according to an embodiment of the present disclosure before a first connecting plate is bent with respect to a guiding plate.

As shown in FIGS. 4 and 5, the electrode tab 120 is provided outside the guiding plate 353 in the width direction Y of the rechargeable battery. The main plate body 3531 of the connecting member 35 is laminated on the electrode assembly body 110, i.e., laminated on the end surface of the separator at the end of the electrode assembly 100 in the longitudinal direction X. This arrangement allows the electrode tab 120 to bear almost no function of fixing and positioning of the electrode assembly 100 in the longitudinal direction X so that the electrode tab 120 can be more effectively protected from damage.

In an embodiment, the first connecting plates 351 of the connecting member 35 may be electrically connected to the electrode tab 120 of the electrode assembly 100 by ultrasonic welding, laser welding, or resistance welding, and the fixed connection with certain strength can be achieved at the same time. After connecting by welding, the first connecting plate 351 of the connecting member 35 is bent laterally so that the internal space occupied by the connecting member 35 and the electrode assembly 100 in the longitudinal direction X of the battery is reduced, thereby improving the energy density of the battery. The main plate body 3531 of the connecting member 35 is pressed against the electrode assembly 100 after being laminated on the end surface of the separator of the electrode assembly 100 so as to support, fix, and position the electrode assembly 100 along the longitudinal direction X of the electrode assembly 100, thereby preventing the electrode assembly 100 from shaking inside the housing 20 after the rechargeable battery is assembled.

In some embodiments, the electrode tab 120 of each of the two electrode assemblies 100 extends from a side of a split of an electrode assembly body 110 of the each electrode assembly 100 perpendicular to the width direction Y close to the other electrode assembly 100. Herein for clear understanding, the split is perpendicular to the width direction Y and and the side of the split is close to the other electrode assembly 100. That is, a portion of the electrode tab 120 connected to the electrode assembly body 110 is located at a middle portion of an end surface of the rechargeable battery in the longitudinal direction X between a split of one electrode assembly body 110 perpendicular to the width direction Y and a split of the other electrode assembly body 110 perpendicular to the width direction Y.

Figure 12:
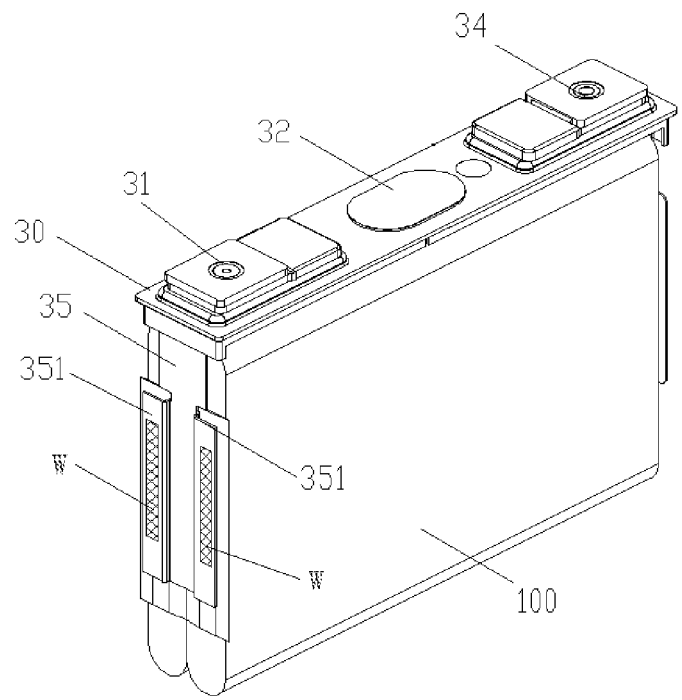
FIG. 12 illustrates a three-dimensional schematic structural diagram of a rechargeable battery according to another embodiment of the present disclosure after the housing is removed.
Figure 13:
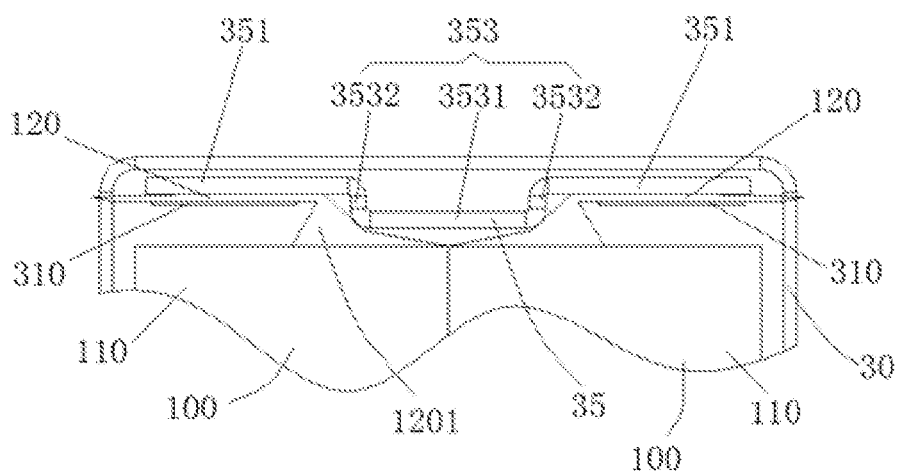
FIG. 13 illustrates an enlarged schematic structural diagram of a part of a bottom view of the rechargeable battery according to the embodiment shown in FIG. 12.
Figure 14:
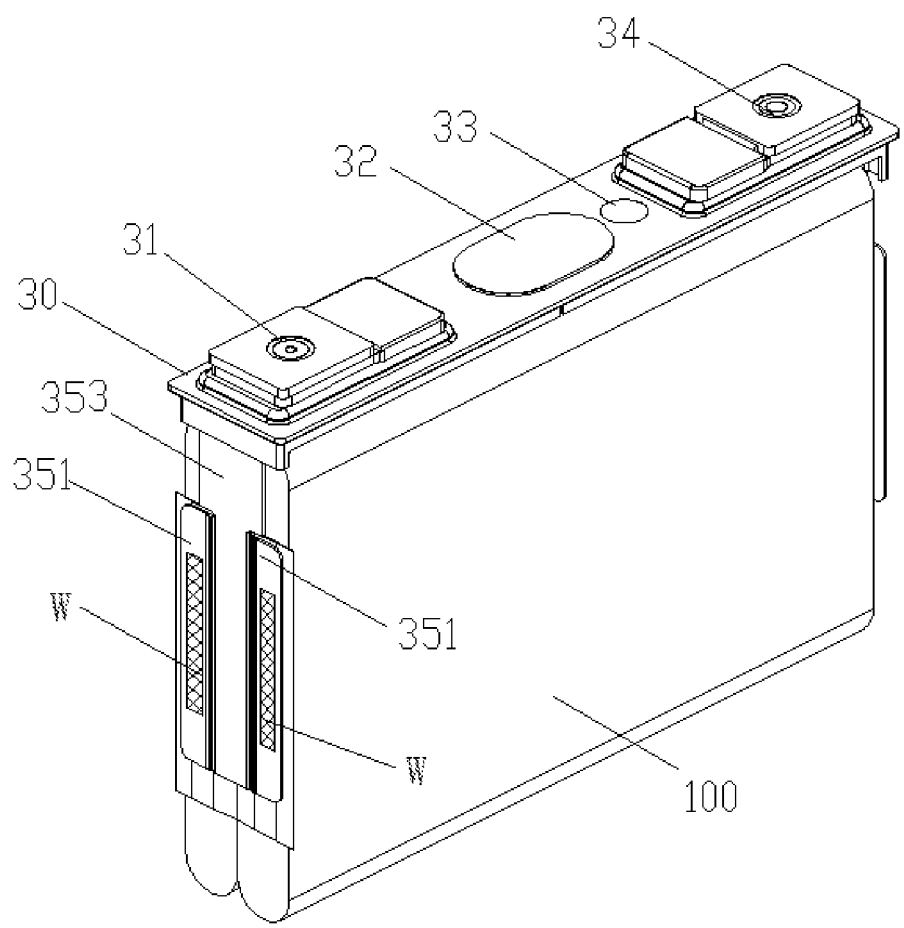
FIG. 14 illustrates a three-dimensional schematic structural diagram of a rechargeable battery according to another embodiment of the present disclosure after the housing is removed.

As shown in FIGS. 12 and 13, the rechargeable battery includes electrode assemblies 100, connecting members 35, a housing (not shown), and a top cover 30. The electrode assembly 100 and the guiding plate 353 and the first connecting plates 351 of the connecting member 35 are located in a mounting space formed by the housing and the top cover 30. The second connecting plate 352 of the connecting member 35 is connected to the electrode component on the top cover 30. The top cover 30 has an explosion-proof valve 32, a positive electrode component 31, a negative electrode component 34 and an injection hole. In FIGS. 12 and 13, W represents the welding position of the first connecting plate 351 and the electrode tab 120.

The structure of the connecting member 35 and the structure of the electrode assembly 100 in the present embodiment are the same as those in the embodiment shown in FIGS. 1-10. However, in the present embodiment, the position where the electrode tab 120 extends from the electrode assembly body 110 is located at the middle portion of an end surface of the rechargeable battery in the longitudinal direction X between a split of one electrode assembly body 110 perpendicular to the width direction Y and a split of the other electrode assembly body 110 perpendicular to the width direction Y. The main plate body 3511 of the guiding plate 351 abuts against a surface of the electrode tab 120.

In the present embodiment, the first connecting plate 351 is bent to be parallel to the end surface of the electrode assembly body 110, effectively reducing the space occupied by the connecting member 35 at the end of the rechargeable battery in the longitudinal direction X. The electrode tab 120 extends from a portion of the end surface of the electrode assembly body 110 in the longitudinal direction X at a side of the split of the electrode assembly body 110 perpendicular to the width direction Y, effectively reducing the thickness of the electrode tab 120, and further reducing the space occupied by the connection between the connecting member 35 and the electrode tab 120. Therefore, the space utilization of the rechargeable battery and the energy density of the rechargeable battery are effectively improved, and the degree of misalignment between the multiple layers of the electrode tab 120 is also lowered after the electrode tab 120 is bent. The portion of the electrode tab 120 connected to the electrode assembly body 110 is located between the guiding plate 353 and the electrode assembly body 110. When the rechargeable battery is vibrated or impacted, the convex portion of the guiding plate 353, which protrudes toward the electrode assembly 100 with respect to the first connecting plate 351, abuts against the electrode assembly 100. The force is mainly borne by the guiding plate 353 of the connecting member 35 so as to effectively alleviate tensile fracture of the electrode tab 120 caused by the vibration or impact on the electrode tab 120. In the meantime, the moveable space for the electrode tab 120 becomes smaller and the possibility of the electrode tab penetrating into the electrode assembly body 110 after being pressed is reduced, thereby reducing the risk of the short circuit inside the battery and increasing the service life and safety performance of the electrode assembly 100.

In some embodiments, as shown in FIG. 13, the tab 120 includes a clamped portion 1201 clamped and supported between the convex portion of the guiding plate 353 and the electrode assembly body 110, and the clamped portion 1201 is laminated on an end surface of the electrode assembly body 110 in the longitudinal direction Y and extends away from a midline of the end surface of the electrode assembly body 110 perpendicular to the width direction Y. Therefore, the convex portion and the electrode assembly 100 are fit to each other more closely so as to improve the space utilization and the energy density of the rechargeable battery, thereby reducing the possibility of tensile rapture of the tab electrode caused by the vibration or impact on the electrode tab 120 as well as the possibility of the electrode tab penetrating into the electrode assembly body 110 after being pressed, and thus reducing the risk of a short circuit inside the rechargeable battery.

In a preferred embodiment, as shown in FIG. 13, the rechargeable battery can further include back-up plates 310 fixedly connected to the first connecting plates 351 and the electrode tab 120, the electrode tab 120 being sandwiched between the first connecting plate 351 and the back-up plate 310. The back-up plates 310 are provided to better fix the electrode tab 120 and to maintain the relative positions between unwelded portions of the multiple layers of the electrode tab 120 when and after the electrode tab 120 is bent.

In some embodiments, the first connecting plates 351 may be even with a plate surface of the guiding plate 353 after being bent.

In the embodiment shown in FIGS. 14-17, the rechargeable battery includes electrode assemblies 100, the connecting members 35, the housing, and the top cover 30. The top cover 30 is provided with an explosion-proof valve 32, an injection hole 33, a positive electrode component 31 and a negative electrode component 34. W represents the welding positions of the first connecting plates 351 and the electrode tab 120.

Figure 15:
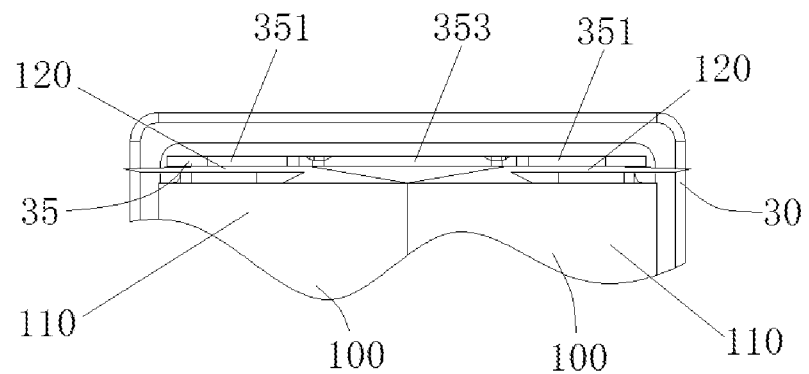
FIG. 15 illustrates an enlarged schematic structural diagram of a part of a bottom view of the rechargeable battery according to the embodiment shown in FIG. 14.

In an embodiment, as shown in FIG. 15, the first connecting plates 351 are bent laterally along the width direction of the guiding plate 353 after being welded to the electrode tab 120, and are parallel to the end surface of the electrode assembly body 110 and even with the plate surface of the guiding plate 353. In this embodiment, the electrode tab 120 of each of the two electrode assemblies 100 extends from a side of the electrode assembly 100 close to the other electrode assembly 100.

In the embodiments which are not shown in the drawings, when the first connecting plates 351 are parallel to the end surface of the electrode assembly body 110 and even with the plate surface of the guiding plate 353, the electrode tab of each of the two electrode assemblies can also extend from a portion of an end surface of the electrode assembly body 110 of one electrode assembly 100 in the longitudinal direction X at a side of a split of the one electrode assembly body 110 perpendicular to the width direction Y away from the other electrode assembly 100.

Figure 16:
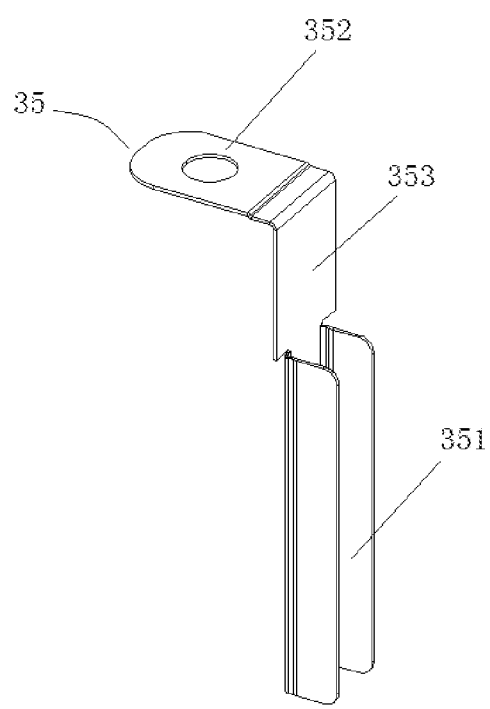
FIG. 16 illustrates a schematic structural diagram of a connecting member of the rechargeable battery according to the embodiment shown in FIG. 14 before a first connecting plate is bent with respect to a guiding plate.
Figure 17:
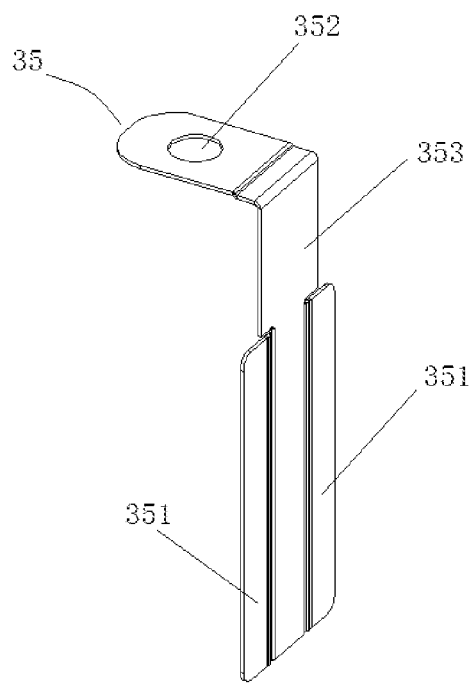
FIG. 17 illustrates a schematic structural diagram of the connecting member of the rechargeable battery according to the embodiment shown in FIG. 14 after the first connecting plate is bent with respect to the guiding plate.
Figure 18:
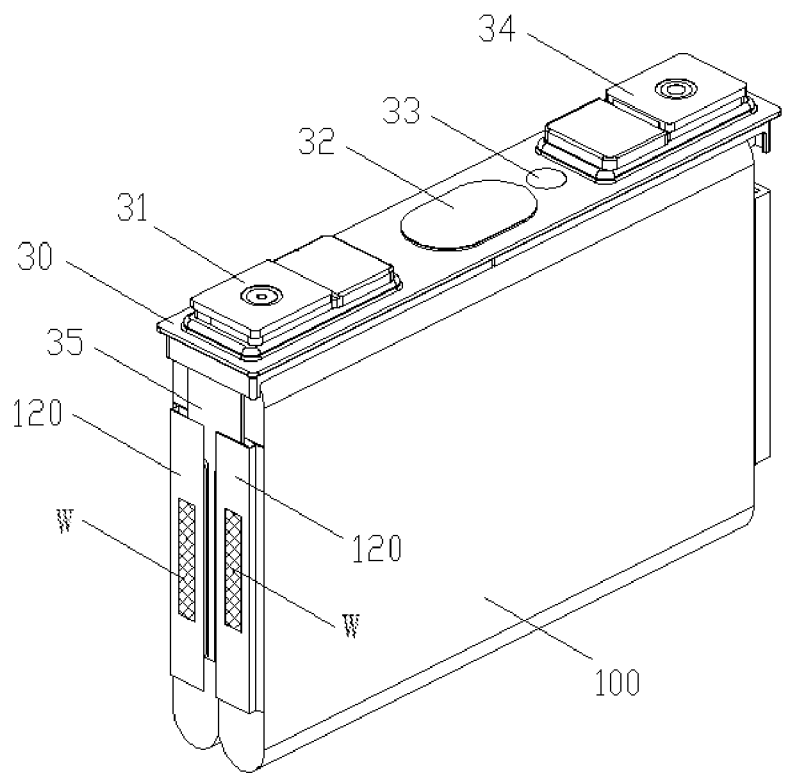
FIG. 18 illustrates a three-dimensional schematic structural diagram of a rechargeable battery according to an embodiment of the present disclosure after the housing is removed.

As shown in FIGS. 16-17, the connecting member 35 includes a guiding plate 353, two first connecting plates 351, which are connected to both sides of the guiding plate 353 in the width direction, respectively, and a second connecting plate 352 connected to the top of the guiding plate 353. The second connecting plate 352 is bent with respect to the first connecting plate 351. Before the first connecting plate 351 is bent with respect to the guiding plate 353, the second connecting plate 352 extends in a direction opposite to the extending direction of the first connecting plate 351.

The first connecting plate 351 is even with the plate surface of the guiding plate 353 after being bent with respect to the guiding plate 353, effectively reducing the space occupied by the connecting member 35 at the end of the electrode assembly 100 in the longitudinal direction X. The electrode tab 120 extends from a side of the electrode assembly body 110 in the width direction Y, effectively reducing the thickness of the electrode tab 120, and further reducing the space occupied by the connection between the connecting member 35 and the electrode tab 120. Therefore, the space utilization of the rechargeable battery and the energy density of the rechargeable battery are effectively improved, and the degree of misalignment between the multiple layers of the electrode tab 120 is also lowered after the electrode tab 120 is bent. In addition, the distance between the electrode tab 120 and the connecting member 35 in the longitudinal direction X of the electrode assembly 100 may be set smaller due to the reduction in the overall thickness of the electrode tab 120, and the moveable space for the electrode tab 120 in the longitudinal direction X of the electrode assembly 100 is effectively reduced. When the rechargeable battery is vibrated or impacted, the electrode tab 120 is not easily damaged, and the possibility of the electrode tab 120 penetrating into the electrode assembly body 110 after being pressed decreases, thereby reducing the risk of the short circuit inside the rechargeable battery and increasing the service life and safety performance of the electrode assembly 100.

In some embodiments, the first connecting plate 351 may be located on the inner side of the guiding plate 353 in the width direction. In this case, one end of the electrode tab 120 away from the electrode assembly body 110 is preferably located at a side of the first connecting plate 351 away from the electrode assembly body 110.

In an embodiment shown in FIGS. 18-21, the rechargeable battery includes the electrode assemblies 100, the connecting members 35, the housing and the top cover 30. The top cover 30 has an explosion-proof valve 32, an injection hole 33, a positive electrode component 31 and a negative electrode component 34. W represents the welding positions of the first connecting plate 351 and the electrode tab 120.

Figure 19:
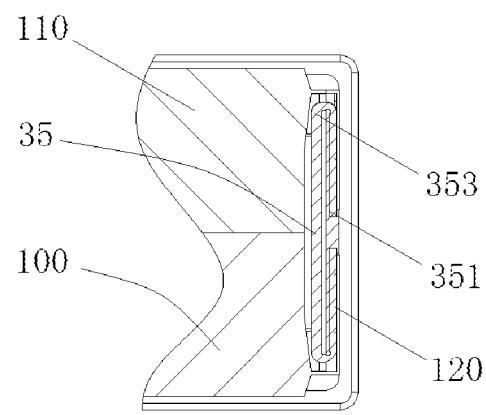
FIG. 19 illustrates an enlarged schematic structural diagram of a part of a bottom view of the rechargeable battery according to the embodiment shown in FIG. 18.

In this embodiment, as shown in FIG. 19, the first connecting plates 351 are bent to the inner side of the guiding plate 353 in the width direction after being welded to the electrode tab 120, and are parallel to the end surface of the electrode assembly body 110. In this embodiment, the electrode tab 120 of each of the two electrode assemblies 100 extends from a side of the electrode assembly 100 away from the other electrode assembly 100.

Figure 20:
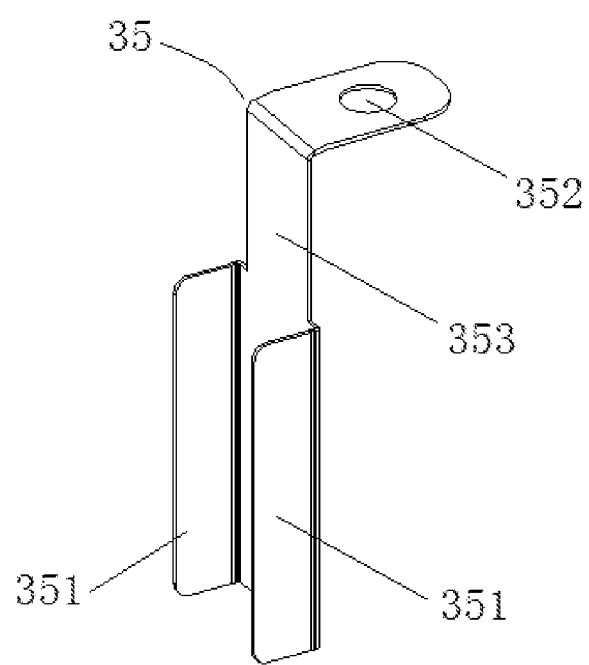
FIG. 20 illustrates a schematic structural diagram of a connecting member of the rechargeable battery according to the embodiment shown in FIG. 18 before a first connecting plate is bent with respect to a guiding plate.
Figure 21:
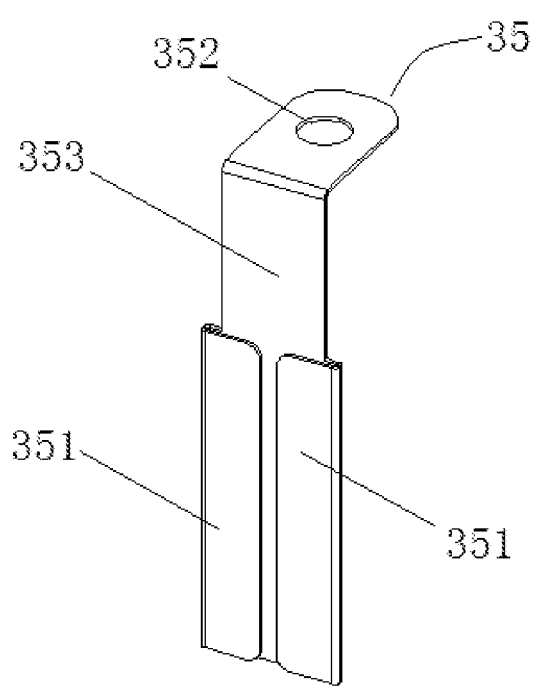
FIG. 21 illustrates a schematic structural diagram of the connecting member of the rechargeable battery according to the embodiment shown in FIG. 18 after the first connecting plate is bent with respect to the guiding plate.

As shown in FIGS. 20-21, in the present embodiment, the connecting member 35 includes a guiding plate 353, two first connecting plates 351, which are connected to both sides of the guiding plate 353 in the width direction, respectively, and a second connecting plate 352 connected to the top of the guiding plate 353. Before the first connecting plate 351 is bent with respect to the guiding plate 353, the second connecting plate 352 extends in a direction opposite to the extending direction of the first connecting plate 351.

In the present embodiment, a notch is provided at the connection between the first connecting plate 351 and the guiding plate 353. The first connecting plates 351 are located at the inner side of the guiding plate 353 in the width direction after being bent, and the two first connecting plates 351 do not overlap one another in the width direction of the guiding plate 353.

The first connecting plate 351 is parallel to the guiding plate 351 after being bent with respect to the guiding plate 353. Bending toward the inner side of the guiding plate 353 can reduce the space occupied by the connecting member 35 at the end of the rechargeable battery in the longitudinal direction X. The electrode tab 120 extends from a portion of an end surface of the electrode assembly body 110 in the longitudinal direction X at a side of the split of the electrode assembly body 110 perpendicular to the width direction Y, effectively reducing the thickness of the electrode tab 120, and further reducing the space occupied by the connection between the connecting member 35 and the electrode tab 120. Therefore, the space utilization of the rechargeable battery and the energy density of the rechargeable battery are effectively improved. The distance between the electrode tab 120 and the connecting member 35 in the longitudinal direction X of the electrode assembly 100 may be set smaller due to the reduction in the overall thickness of the electrode tab 120, and the moveable space for the electrode tab 120 in the longitudinal direction X of the electrode assembly 100 is effectively reduced. When the rechargeable battery is vibrated or impacted, the electrode tab 120 is not easily damaged, and the possibility of the electrode tab 120 penetrating into the electrode assembly body 110 after being pressed decreases, thereby reducing the risk of the short circuit inside the battery and increasing the service life and safety performance of the electrode assembly 100. Compared with the case that the first connecting plates 351 are bent to the outer sides of the guiding plate 353 in the width direction, this arrangement is advantageous in that the minimum current flow width of the guiding plate 353 can be widened under a constant thickness of the rechargeable battery so as to improve the fast charging capacity of the rechargeable battery.

In some embodiments which are not shown in the drawings, the first connecting plates 351 are parallel to the guiding plate 353 after being bent with respect to the guiding plate 353. When the first connecting plates 351 are bent to the inner side of the guiding plate 353, the electrode tab 120 of each of the two electrode assemblies 100 can extend from the side of the electrode assembly 100 close to the other electrode assembly 100.

Figure 22:
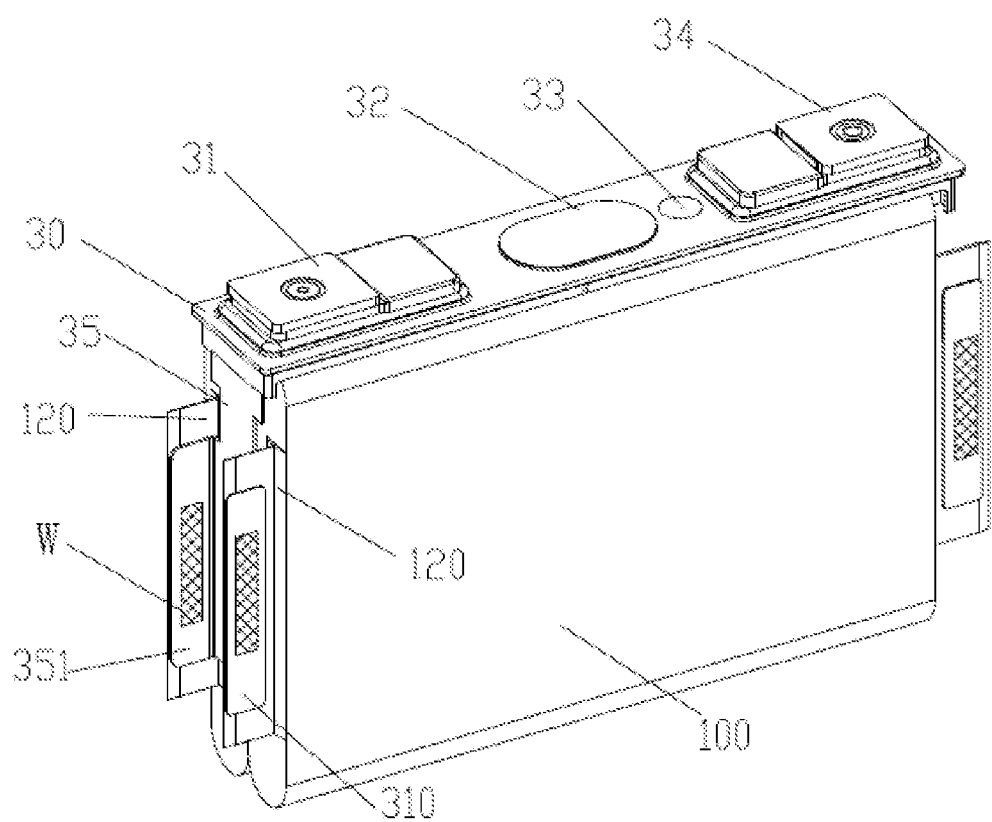
FIG. 22 illustrates a three-dimensional schematic structural diagram of a rechargeable battery according to an embodiment of the present disclosure after the housing is removed, wherein a first connecting member is already connected to an electrode tab but not bent.
Figure 23:
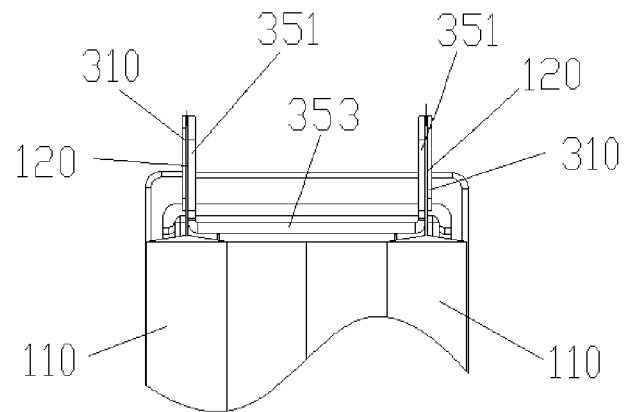
FIG. 23 illustrates an enlarged schematic structural diagram of a part of a bottom view of the rechargeable battery according to the embodiment shown in FIG. 22.
Figure 24:
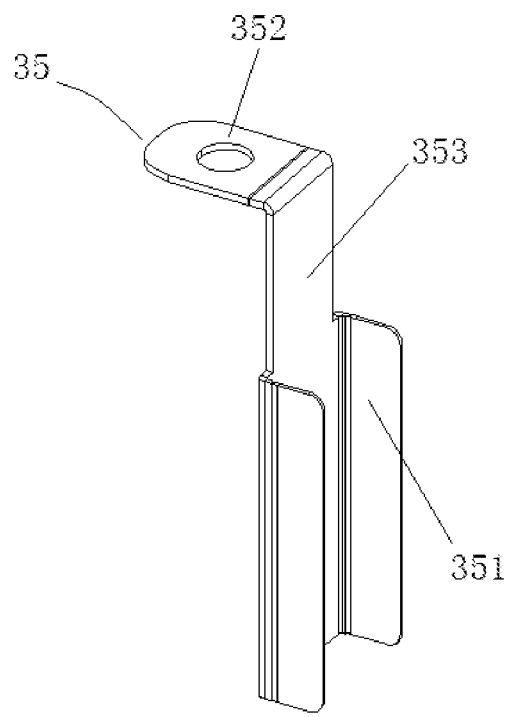
FIG. 24 illustrates a three-dimensional schematic structural diagram of a connecting member of a rechargeable battery according to an embodiment before a first connecting plate is bent with respect to a guiding plate.
Figure 25:
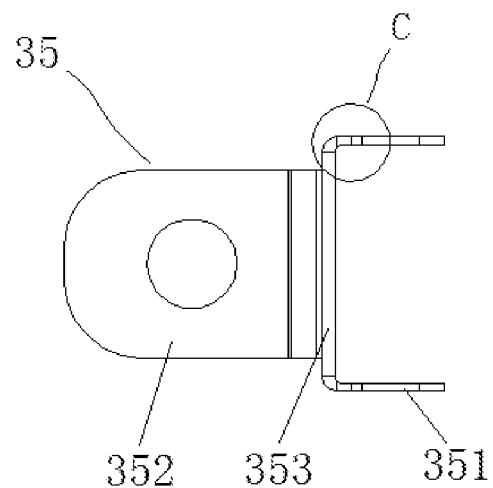
FIG. 25 illustrates a bottom view of FIG. 24.
Figure 26:
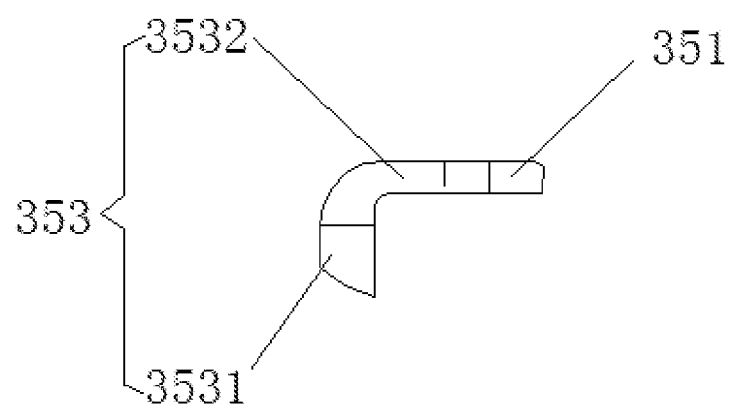
FIG. 26 illustrates an enlarged schematic structural diagram of part C in FIG. 25.
Figure 27:
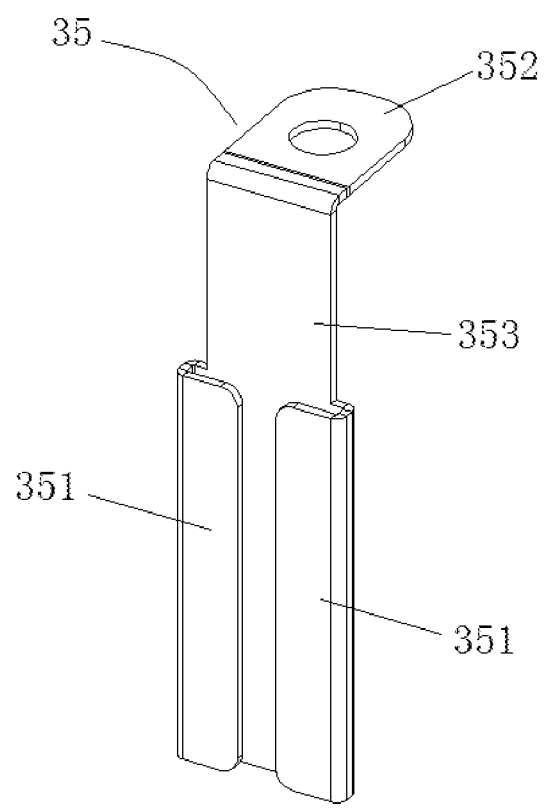
FIG. 27 illustrates a three-dimensional schematic structural diagram of the connecting member of the rechargeable battery according to the embodiment shown in FIG. 24 after the first connecting plate is bent with respect to the guiding plate.
Figure 28:
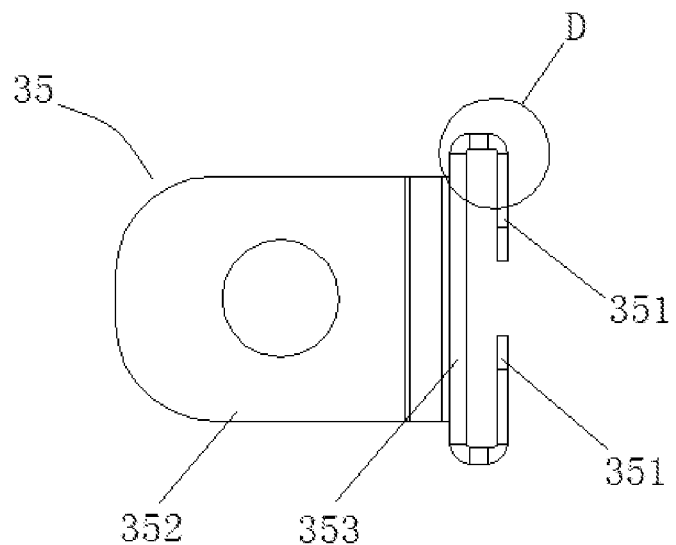
FIG. 28 illustrates a bottom view of FIG. 27.
Figure 29:
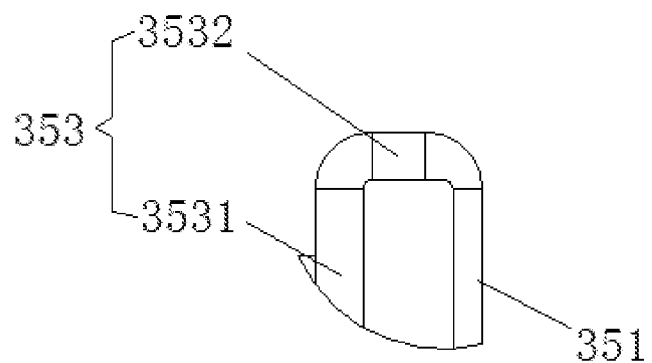
FIG. 29 illustrates an enlarged schematic structural diagram of part D in FIG. 28.
Figure 30:
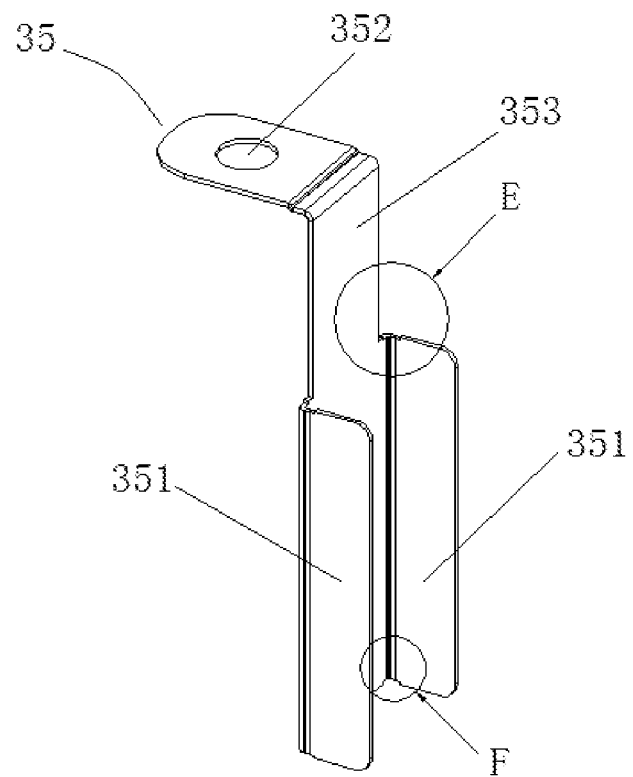
FIG. 30 illustrates a three-dimensional schematic structural diagram of a connecting member of a rechargeable battery according to an embodiment of the present disclosure before the first connecting plate is bent with respect to the guiding plate.
Figure 31:
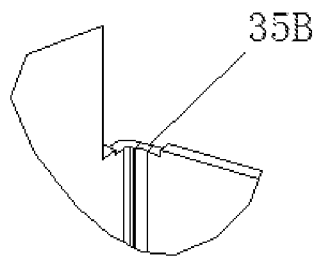
FIG. 31 illustrates an enlarged schematic structural diagram of part E in FIG. 30.
Figure 32:
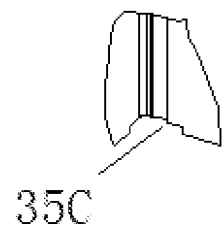
FIG. 32 illustrates an enlarged schematic structural diagram of part F in FIG. 30.
Figure 33:
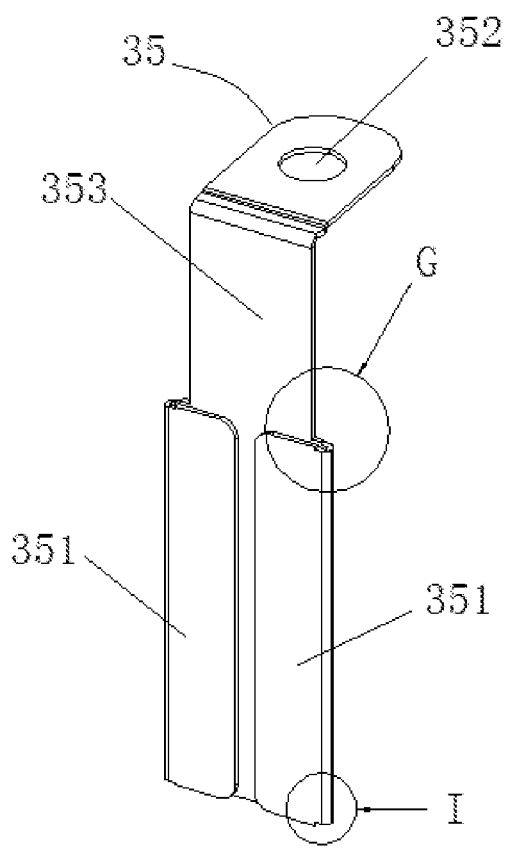
FIG. 33 illustrates a three-dimensional schematic structural diagram of the connecting member of the rechargeable battery according to the embodiment shown in FIG. 30 after the first connecting plate is bent with respect to the guiding plate.
Figure 34:
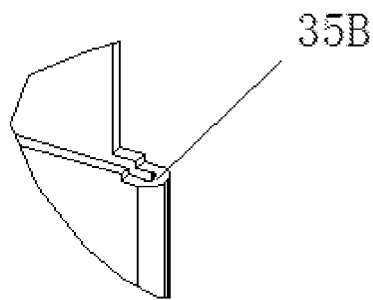
FIG. 34 illustrates an enlarged schematic structural diagram of part G in FIG. 33.
Figure 35:
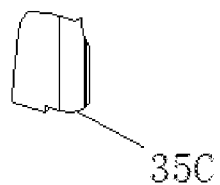
FIG. 35 illustrates an enlarged schematic structural diagram of part I in FIG. 33.

In a preferred embodiment, as shown in FIGS. 22-23, the rechargeable battery can further include back-up plates 310 fixedly connected to the first connecting plates 351 and the electrode tab 120, the electrode tab 120 being sandwiched between the first connecting plate 351 and the back-up plate 310.

On the one hand, the back-up plates 310 can better fix the electrode tab 120 and maintain the relative positions between unwelded portions of the multiple layers of the electrode tab 120 when and after the electrode tab 120 is bent; on the other hand, the back-up plates 310 also can reduce the direct impact on the portion of the electrode tab 120 welded to the connecting member 35 after vibration and impact occur to the rechargeable battery, so as to protect the electrode tab 120 and prolong the service life of the rechargeable battery.

In a preferred embodiment, the thickness of the first connecting plate 351 may be less than the thickness of the guiding plate 353.

As shown in FIGS. 24-29, the thickness of the first connecting plate 351 of the connecting member 35 is set to be smaller than the thickness of the guiding plate 353. Compared with the connecting member including the guiding plate having the same thickness as the first connecting plate, this connecting member 35 would occupy further less space of the rechargeable battery after being bent, so that the energy density of the rechargeable battery can be further increased. In the meantime, since the thickness of the first connecting plate 351 is reduced, the welding assembling quality of the first connecting plate 351 and the electrode tab 120 of the rechargeable battery can be effectively improved. However, the thickness of the guiding plate 353 remains large, so that the resistance of the guiding plate may be reduced to allow the internal resistance of the rechargeable battery to meet the requirements, and the rechargeable battery will not be heated rapidly during the charging and discharging with a high rate current. In addition, the smaller thickness of the first connecting plate 351 than the guiding plate 353 can facilitates the bending of the first connecting plates 351, so as to ensure the relative position of the connecting member 35 and the electrode assembly 100 after the bending, thereby facilitating the assembling and reducing the risk of the electrode assembly body 110 or the electrode tab 120 being damaged during the bending.

In the embodiment shown in FIGS. 24-29, the first connecting plates 351 are bent toward the plate surface of the guiding plate 353 in the width direction. In some embodiments which are not shown in the drawings, in the case of the thickness of the first connecting plate 351 being set to be smaller than the thickness of the guiding plate 353, the first connecting plate 351 may be bent away from the plate surface of the guiding plate 353 in the width direction, until the plate surface of the first connecting plate 351 is even with the plate surface of the guiding plate 353, or until the guiding plate 353 protrudes toward the electrode assembly body 110 with respect to the first connecting plate 351.

In a preferred embodiment, an end of the connecting portion between the guiding plate 353 and the first connecting plate 351 may further be provided with an anti-cracking groove.

As shown in FIGS. 29-34, a first groove 35B is provided at an upper end of a connecting portion between the guiding plate 353 and the first connecting plate 351 of the connecting member 35, and a second groove 35C is provided at a lower end of the connecting portion. The anti-cracking grooves can prevent the connecting member 35 from being easily broken at the end of the connecting portion during the bending process, and effectively eliminate the end cracking problem of the connecting member 35 during the bending process.

In the embodiment shown in FIGS. 30-35, the first connecting plates 351 are bent toward the inner side of the guiding plate 353 in the width direction. In some embodiments which are not shown in the drawings, in the case that the ends of the connecting portion between the guiding plate 353 and the first connecting plate 351 are provided with the anti-cracking grooves, the first connecting plates 351 may be bent toward the outer sides of the guiding plate 353 in the width direction, until the plate surface of the first connecting plate 351 is even with the plate surface of the guiding plate 353, or until the guiding plate 353 protrudes toward the electrode assembly body 110 with respect to the first connecting plate 351.

In a preferred embodiment, the connecting member 35 includes two first connecting plates 351A and 351B, which are disposed on two sides of the guiding plate 353, respectively, and a second connecting plate 352 disposed on the upper end of the guiding plate 353, wherein the top ends of the two first connecting plates 351A and 351B begin at different heights.

Figure 36:
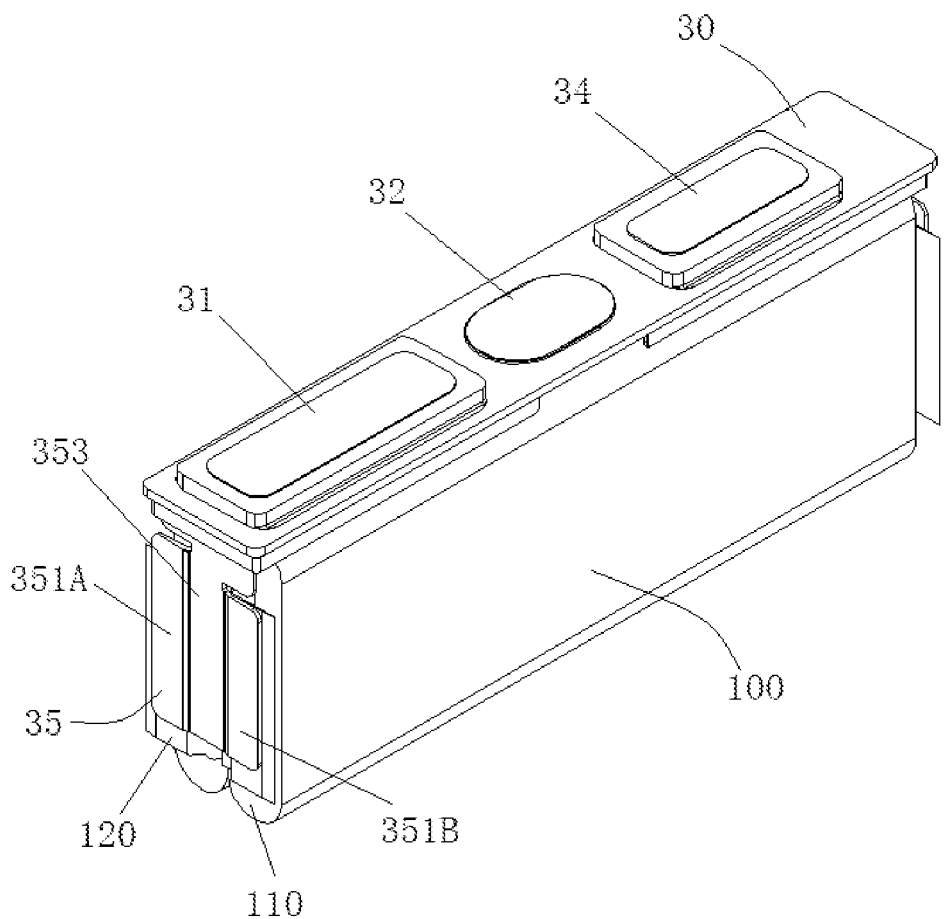
FIG. 36 illustrates a three-dimensional schematic structural diagram of a rechargeable battery according to an embodiment of the present disclosure after the housing is removed.
Figure 37:
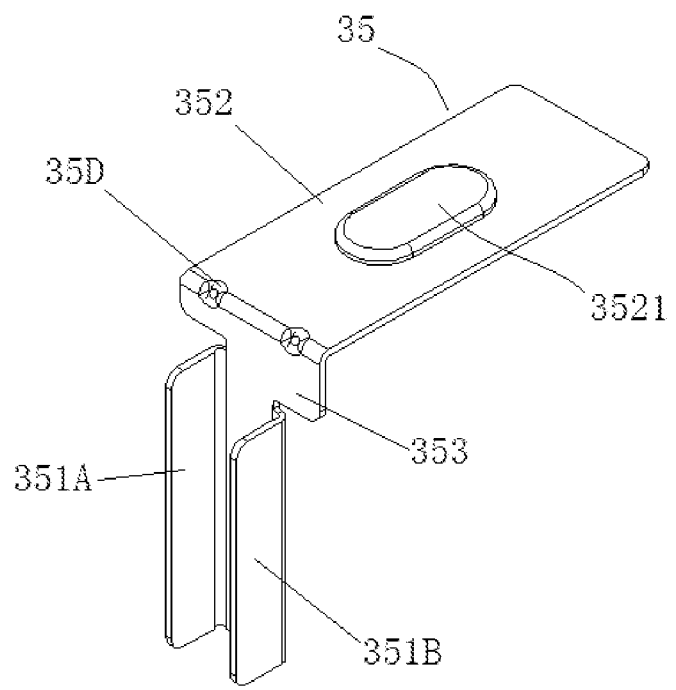
FIG. 37 illustrates a three-dimensional schematic structural diagram of a connecting member of the rechargeable battery according to the embodiment shown in FIG. 36 before a first connecting plate is bent with respect to a guiding plate.
Figure 38:
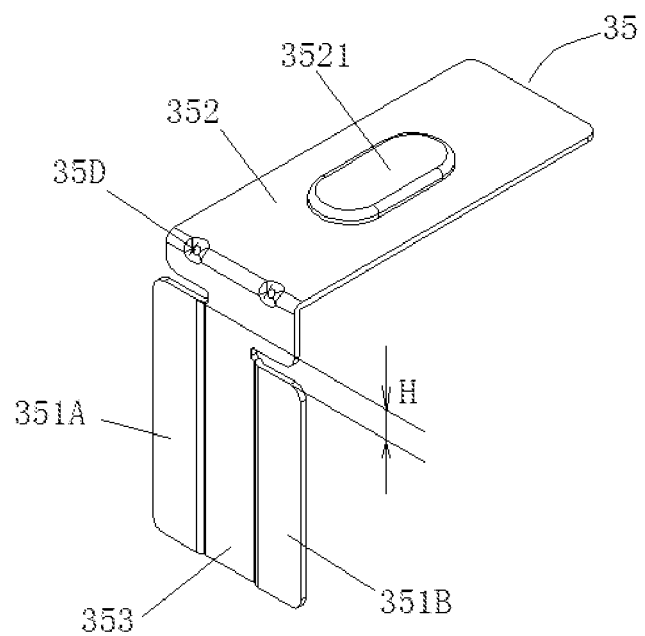
FIG. 38 illustrates a schematic structural diagram of the connecting member of the rechargeable battery according to the embodiment shown in FIG. 36 after the first connecting plate is bent with respect to the guiding plate.

As shown in FIGS. 36-38, the connecting member 35 includes first connecting plates 351A and 351B which are located on both sides of the guiding plate 35, respectively, wherein a beginning height of the top end of the first connecting plate 351A at the top end of the guiding plate 353 is higher than a beginning height of the top end of the first connecting plate 351B. In FIG. 37, H represents a height difference between the beginning height of the top end of the first connecting plate 351A and the beginning height of the top end of the first connecting plate 351B.

Due to the increasing demand for rapid charging of the rechargeable battery, the connecting member 35 needs to have a large current flow area. During charging or discharging, the current flowing through the first connecting plates 351A and 351B flows through a portion of the guiding plate 353 connected to the second connecting plate 352. Since the first connecting plates need to be bent, the width in the width direction Y of the portion where the guiding plate 353 is connected to the first connecting plates is limited. Sometimes, the width is so narrow that there may exist a necking in the current transmission path of the connecting member 35 from the first connecting plate 351 through the guiding plate 353 to the second connecting plate 352. If the first connecting plates located on the two sides of the guiding plate 353 have top ends of the same height, the size of the necking is equal to the width of the guiding plate 353 (or the main plate body of the guiding plate 353 in some embodiments). If the top ends of the first connecting plates begin at the different heights, the size of the necking is equal to a length of a connecting line connecting two end points, which are as high as the heights of the two first connecting plates, respectively, at two ends of the guiding plate 353 (or the main plate body) in the width direction, thereby enlarging the flow area and improving the rapid charging capacity and safety performance of rechargeable battery.

In a preferred embodiment, the guiding plate 353 and the second connecting plate 352 are integrally formed by bending a sheet material, and at least one protrusion 35D is formed at the bending position between the guiding plate 353 and the second connecting plate 352.

As shown in FIGS. 37 and 38, the guiding plate 353 and the second connecting plate 352 of the connecting member 35 are formed by bending, two protrusions 35D are formed at the bending position between the guiding plate 353 and the second connecting plate 352. The protrusions 35D help to maintain the relative positions of the guiding plate 353 and the second connecting plate 352 when the first connecting plates 351 are bent, so that the components connected to the connecting member 35, such as the electrode assemblies 100, the top cover 30 and the housing 20 and so on are positioned accurately with respect to one another during the assembling of the rechargeable battery, thereby completing the assembling smoothly and improving the quality of rechargeable batteries. Moreover, when the rechargeable battery is subjected to impact or vibration, a deformation amount of the guiding plate 353 with respect to the second connecting plate 352 is reduced, thereby protecting the electrode tab 120. In this embodiment, the two protrusions 35D are evenly arranged along the bending position between the guiding plate 353 and the second connecting plate 352.

In addition, in the present embodiment, the connection to the electrode component is achieved by a welding-connecting portion 3521.

In some embodiments which are not shown in the drawings, the first connecting plate may be connected to two sets of electrode assemblies, i.e., the rechargeable battery may include two set of electrode assemblies. For example, the connecting member may include two first connecting plates located on two sides thereof in the width direction, respectively, each of the first connecting plates being connected to one set of electrode assemblies. The two sets of electrode assemblies are arranged side by side along the width direction and form two sets of electrode tabs of the same polarity at the same end of the rechargeable battery, and the two sets of electrode tabs are respectively bent with respect to the longitudinal direction and are connected to the two first connecting plates. Each set of electrode assemblies may include two electrode assemblies. An electrode tab of one electrode assembly in one set of the two sets of electrode assemblies protrudes from a portion of an end surface of an electrode assembly body of the one electrode assembly in the longitudinal direction at a side of a split of the electrode assembly body perpendicular to the width direction close to the other electrode assembly in the one set. Herein for clear understanding, said portion of the end surface is at the side of the split of the electrode assembly body perpendicular to the width direction and the side of the split is close to the other electrode assembly in the one set. As another example, an electrode tab of each electrode assembly in one set of the two set of electrode assemblies protrudes from a portion of an end surface of an electrode assembly body of the each electrode assembly in the longitudinal direction at a side of a split of the electrode assembly body perpendicular to the width direction away from the other set of the two sets of electrode assemblies, or an electrode tab of each electrode assembly in one set of the two set of electrode assemblies protrudes from a portion of an end surface of an electrode assembly body of the each electrode assembly in the longitudinal direction at a side of a split of the electrode assembly body perpendicular to the width direction close to the other set of the two sets of electrode assemblies.

In the above embodiments of the present disclosure, as long as the technical features do not conflict with one other, the related technical contents in other embodiments can be referred or combined.

It should be noted that the above embodiments of the present disclosure are merely used to illustrate the technical solutions of the present disclosure, but are not intended to limit the present disclosure. Despite of the detailed description of the present disclosure with reference to the preferred embodiments, it is to be understood by those skilled in the art that various modifications of the specific embodiments of the present disclosure and equivalent substitutions of parts of the technical features are allowed without departing from the scope of the technical solutions of the present disclosure. Without departing from principles of the present disclosure, these modifications and equivalent substitutions should be included in the protection scope of the invention.

The invention claimed is:

1. A rechargeable battery, comprising an electrode assembly and a connecting member,
wherein the electrode assembly comprises an electrode assembly body and an electrode tab protruding from the electrode assembly body, the electrode assembly body and the electrode tab are arranged in a longitudinal direction, and the longitudinal direction is perpendicular to a plane defined by a width direction and a height direction of the electrode assembly,
the connecting member comprises a guiding plate and a first connecting plate connected to the guiding plate, wherein the guiding plate comprises a main plate body parallel to an end surface of the electrode assembly body and a flanging portion, the flanging portion is located at a lateral edge of the main plate body in the width direction and extends along the longitudinal direction and in a direction away from the electrode assembly body, and the first connecting plate is connected to the guiding plate by the flanging portion; and, wherein the electrode tab has a stacked multi-layer structure, the electrode tab protrudes from a portion of the end surface of the electrode assembly body in the longitudinal direction is bent with respect to the longitudinal direction and is connected to the first connecting plate, and
the electrode assembly body comprises a winding start layer, wherein the winding start layer is an end portion of an innermost electrode sheet of the electrode assembly body from which winding is started, and the electrode tab protrudes from a portion of the end surface of the electrode assembly body in the longitudinal direction at a side of a plane in which the winding start layer is located.

2. The rechargeable battery according to claim 1, wherein the electrode assembly comprises a positive electrode tab and a negative electrode tab, wherein the positive electrode tab and the negative electrode tab protrude from the same side of the split of the electrode assembly body perpendicular to the width direction, respectively; or
the positive electrode tab and the negative electrode tab protrude from different sides of the split of the electrode assembly body perpendicular to the width direction, respectively.

3. The rechargeable battery according to claim 1, wherein the electrode assembly comprises a positive electrode tab and a negative electrode tab, wherein the positive electrode tab and the negative electrode tab protrude from the same side of the plane in which the winding start layer is located, respectively; or
the positive electrode tab and the negative electrode tab protrude from different sides of the plane in which the winding start layer is located, respectively.

4. The rechargeable battery according to claim 1, wherein the connecting member comprises two first connecting plates which are connected to two edges of the guide plate in the width direction, respectively, the rechargeable battery comprises two sets of electrode assemblies, the two sets of electrode assemblies are arranged side by side along the width direction and form two sets of electrode tabs of the same polarity at the same end of the rechargeable battery, and the two sets of electrode tabs are respectively bent with respect to the longitudinal direction and are connected to the two first connecting plates.

5. The rechargeable battery according to claim 4, wherein an electrode tab of each electrode assembly in one set of the two set of electrode assemblies protrudes from a portion of an end surface of an electrode assembly body of the each electrode assembly in the longitudinal direction at a side of a split of the electrode assembly body perpendicular to the width direction away from the other set of the two sets of electrode assemblies, or an electrode tab of each electrode assembly in one set of the two set of electrode assemblies protrudes from a portion of an end surface of an electrode assembly body of the each electrode assembly in the longitudinal direction at a side of a split of the electrode assembly body perpendicular to the width direction close to the other set of the two sets of electrode assemblies.

6. The rechargeable battery according to claim 5, wherein each of the two sets of electrode assemblies comprises two electrode assemblies and an electrode tab of one electrode assembly in one set of the two sets of electrode assemblies protrudes from a portion of an end surface of an electrode assembly body of the one electrode assembly in the longitudinal direction at a side of a split of the electrode assembly body perpendicular to the width direction close to the other electrode assembly in the one set.

7. The rechargeable battery according to claim 4, wherein each of the two first connecting plates extends away from the plate surface of the guiding plate along the width direction or extends toward the plate surface of the guiding plate along the width direction.

8. The rechargeable battery according to claim 1, wherein at least a part of the electrode tab is placed between the first connecting plate and the electrode assembly body.

9. The rechargeable battery according to claim 1, wherein at least a part of the guiding plate protrudes toward the electrode assembly body with respect to the first connecting plate to form a convex portion, the convex portion abutting against the electrode assembly body.

10. The rechargeable battery according to claim 9, wherein the convex portion is laminated on the electrode assembly body.

11. The rechargeable battery according to claim 1, wherein the guiding plate comprises a main plate body and a flanging portion, the flanging portion is located at a lateral edge of the main plate body in the width direction and extends in a direction away from the electrode assembly body, and the first connecting plate is connected to the guiding plate by the flanging portion.

* * * * *